United States Patent
Rutt

(10) Patent No.: US 11,332,833 B2
(45) Date of Patent: *May 17, 2022

(54) METHODS, APPARATUSES, AND ELECTRODES FOR CARBIDE-TO-CARBON CONVERSION WITH NANOSTRUCTURED CARBIDE CHEMICAL COMPOUNDS

(71) Applicant: WEST VIRGINIA UNIVERSITY RESEARCH CORPORATION, Morgantown, WV (US)

(72) Inventor: J. Steven Rutt, Burke, VA (US)

(73) Assignee: West Virginia Research Corporation, Morgantown, WV (US)

( * ) Notice: Subject to any disclaimer, the term of this patent is extended or adjusted under 35 U.S.C. 154(b) by 578 days.

This patent is subject to a terminal disclaimer.

(21) Appl. No.: 15/491,715

(22) Filed: Apr. 19, 2017

(65) Prior Publication Data

US 2017/0306509 A1 Oct. 26, 2017

Related U.S. Application Data

(60) Provisional application No. 62/325,281, filed on Apr. 20, 2016.

(51) Int. Cl.
| | |
|---|---|
| *C01B 31/02* | (2006.01) |
| *C25B 11/057* | (2021.01) |
| *C01B 32/184* | (2017.01) |
| *C01B 32/25* | (2017.01) |
| *C01B 32/914* | (2017.01) |
| *C25B 11/04* | (2021.01) |
| *C01B 32/942* | (2017.01) |
| *C01B 32/05* | (2017.01) |
| *C25B 1/00* | (2021.01) |

(52) U.S. Cl.
CPC ............ *C25B 11/057* (2021.01); *C01B 32/05* (2017.08); *C01B 32/184* (2017.08); *C01B 32/25* (2017.08); *C01B 32/914* (2017.08); *C01B 32/942* (2017.08); *C25B 1/00* (2013.01); *C25B 11/04* (2013.01); *C01P 2004/20* (2013.01); *C01P 2004/64* (2013.01); *C01P 2006/40* (2013.01)

(58) Field of Classification Search
CPC .................................................... C01B 32/05
See application file for complete search history.

(56) References Cited

U.S. PATENT DOCUMENTS

| | | |
|---|---|---|
| 380,775 A | 4/1888 | Thowless |
| 1,271,713 A | 7/1918 | Hutchins |
| 1,319,148 A | 10/1919 | Freeman |
| 1,528,824 A | 3/1925 | Hackspill et al. |
| 1,889,951 A | 12/1932 | Cox |
| 2,323,597 A | 7/1941 | Hansgirg |
| 2,382,713 A | 8/1945 | Hansgirg |
| 2,729,689 A | 1/1956 | Blanchard et al. |
| 2,739,041 A | 3/1956 | Andersen |
| 2,760,847 A | 8/1956 | Oblad et al. |
| 2,813,017 A | 11/1957 | Mathieu |
| 2,892,762 A | 6/1959 | Stern et al. |
| 3,031,413 A | 4/1962 | Barber |
| 3,066,099 A | 11/1962 | Mohun |
| 3,201,052 A | 8/1965 | Feldmann et al. |
| 4,105,440 A | 8/1978 | Gentaz et al. |
| 4,275,050 A | 6/1981 | French et al. |
| 4,508,666 A | 4/1985 | Pietzarka et al. |
| 4,738,759 A | 4/1988 | Bienvenu et al. |
| 4,820,339 A | 4/1989 | Bienvenu et al. |
| 4,990,403 A | 2/1991 | Ito |
| 5,384,016 A | 1/1995 | Lin et al. |
| 5,560,898 A | 10/1996 | Uchida et al. |
| 5,599,624 A | 2/1997 | Prochazka |
| 5,680,292 A | 10/1997 | Thompson, Jr. et al. |
| 5,997,832 A | 12/1999 | Lieber et al. |
| 6,214,309 B1 | 4/2001 | Shaw et al. |
| 6,451,279 B1 | 9/2002 | Froes et al. |
| 6,479,028 B1 | 11/2002 | Kaner et al. |
| 6,514,897 B1 | 2/2003 | Moy et al. |
| 6,579,833 B1 | 6/2003 | McNallan et al. |

(Continued)

FOREIGN PATENT DOCUMENTS

| | | |
|---|---|---|
| CN | 1498976 | 5/2004 |
| CN | 1590288 A | 3/2005 |

(Continued)

OTHER PUBLICATIONS

Yang et al, "Nanostructured tungsten carbide catalysts for polymer electrolyte fuel cells", Applied Physics Letters, vol. 86, 224104 (2005).
Abanades A., et al., "Development of methane decarbonisation based on Liquid Metal Technology for CO2-free production of hydrogen", Int'l J. of Hydrogen Energy, Elsevier Sci. Publishers B.V., Barking GB, vol. 41(19) Dec. 23, 2015, pp. 8159-8167.
Abbas et al., "Hydrogen production by methane decomposition: A review", I nt'l Journal of Hydrogen Energy, 3 5 (2010) 1160-1190.
Aiello et al., "Hydrogen production via the direct cracking of methane over Ni/SiO2", Applied Catalysis A: General, vol. 192 (2000) pp. 227-234.
Atkins, Elements of Physical Chemistry, NIST webbook (Table of Contents only).

(Continued)

*Primary Examiner* — Stuart L Hendrickson
(74) *Attorney, Agent, or Firm* — STIP Law Group, LLC

(57) ABSTRACT

Nanostructured carbide chemical compound is used to convert carbide to carbon. A method comprising: providing at least one carbide chemical compound and reducing a metal cation with use of the carbide chemical compound to form elemental carbon, wherein the carbide chemical compound is nanostructured. The nanostructured carbide chemical compound can be in the form of a nanoparticle, a nanowire, a nanotube, a nanofilm, a nanoline. The reactant can be a metal salt. Electrochemical reaction, or reaction in the melt or in solution, can be used to form the carbon. The nanostructured carbide chemical compound can be an electrode.

98 Claims, 1 Drawing Sheet

(56) References Cited

U.S. PATENT DOCUMENTS

| | | | |
|---|---|---|---|
| 6,670,058 B2 | 12/2003 | Muradov | |
| 6,793,875 B1 | 9/2004 | Shaw et al. | |
| 6,995,115 B2 | 2/2006 | Wang et al. | |
| 7,025,945 B2 | 4/2006 | Nishi et al. | |
| 7,157,167 B1 | 1/2007 | Muradov | |
| 7,744,843 B2 | 6/2010 | Gogotsi | |
| 7,972,725 B2 | 7/2011 | Krause et al. | |
| 8,242,030 B2 | 8/2012 | Hannon et al. | |
| 9,701,539 B2 | 7/2017 | Stiller | |
| 9,764,958 B2 | 9/2017 | Stiller | |
| 9,909,222 B2 * | 3/2018 | Stiller | C25B 1/00 |
| 10,035,709 B2 | 7/2018 | Stiller | |
| 2001/0047980 A1 | 12/2001 | McNallan et al. | |
| 2002/0151604 A1 | 10/2002 | Detering et al. | |
| 2002/0197200 A1 | 12/2002 | Froes et al. | |
| 2003/0008772 A1 | 1/2003 | Ma et al. | |
| 2004/0028948 A1 | 12/2004 | Nishi | |
| 2005/0058875 A1 | 3/2005 | Jerome | |
| 2005/0063900 A1 | 3/2005 | Wang et al. | |
| 2005/0170181 A1 | 8/2005 | Nishi et al. | |
| 2005/0171370 A1 | 8/2005 | Nishi et al. | |
| 2006/0068125 A1 | 3/2006 | Radhakrishnan | |
| 2006/0140846 A1 | 6/2006 | Leis et al. | |
| 2006/0165584 A1 | 7/2006 | Gogotsi et al. | |
| 2006/0165988 A1 | 7/2006 | Chiang et al. | |
| 2006/0251565 A1 | 11/2006 | Leis et al. | |
| 2008/0159938 A1 | 7/2008 | Mauthner et al. | |
| 2008/0169749 A1 | 7/2008 | Kim et al. | |
| 2008/0210908 A1 | 9/2008 | Zhu et al. | |
| 2008/0219913 A1 | 9/2008 | Gogotsi | |
| 2008/0248310 A1 | 10/2008 | Kim et al. | |
| 2008/0263954 A1 | 10/2008 | Hammel et al. | |
| 2009/0036302 A1 | 2/2009 | Gogotsi et al. | |
| 2009/0087543 A1 | 4/2009 | Nicholas et al. | |
| 2009/0117094 A1 | 5/2009 | Leis et al. | |
| 2009/0213529 A1 | 8/2009 | Gogotsi et al. | |
| 2009/0258782 A1 | 10/2009 | Gogotsi et al. | |
| 2009/0301902 A1 | 12/2009 | Gogotsi et al. | |
| 2010/0012576 A1 | 1/2010 | Hoffman et al. | |
| 2010/0233546 A1 | 9/2010 | Nesper et al. | |
| 2011/0033366 A1 | 2/2011 | Wagner | |
| 2011/0123428 A1 | 5/2011 | Liu et al. | |
| 2011/0287174 A1 | 11/2011 | Calabrese Barton et al. | |
| 2011/0290655 A1 | 12/2011 | Nishikiori et al. | |
| 2012/0148473 A1 | 6/2012 | Kramarenko | |
| 2012/0219488 A1 | 8/2012 | Dash | |
| 2012/0241327 A1 | 9/2012 | Suib et al. | |
| 2012/0256121 A1 | 10/2012 | Wolf et al. | |
| 2014/0142007 A1 | 5/2014 | Lim et al. | |
| 2014/0271441 A1 | 9/2014 | Stiller | |
| 2014/0311292 A1 | 10/2014 | McCann | |
| 2014/0328749 A1 | 11/2014 | Hammel et al. | |
| 2015/0071847 A1 | 3/2015 | Ishikawa et al. | |
| 2015/0191355 A1 | 7/2015 | Kang et al. | |
| 2015/0210547 A1 | 7/2015 | Kang et al. | |
| 2016/0002049 A1 | 1/2016 | Stiller | |
| 2016/0115600 A1 | 4/2016 | Stiller et al. | |

FOREIGN PATENT DOCUMENTS

| | | |
|---|---|---|
| CN | 101125652 | 2/2008 |
| CN | 100439238 C | 12/2008 |
| CN | 102390828 A | 3/2012 |
| CN | 103436904 A | 12/2013 |
| CN | 105037988 | 11/2015 |
| DE | 1667532 | 7/1971 |
| DE | DD 259147 A1 | 8/1988 |
| EP | 1916233 A1 | 4/2008 |
| FR | 1071197 | 8/1954 |
| JP | S 52-128525 | 4/1976 |
| JP | 58-501430 | 8/1983 |
| JP | 7-48111 | 7/1995 |
| JP | 11302826 | 11/1999 |
| JP | 2008-105922 | 5/2008 |
| JP | 2008-542184 | 11/2008 |
| JP | 2011-037693 | 2/2011 |
| JP | 2012-166980 | 9/2012 |
| KR | 10-1472313 | 12/2014 |
| RU | 2181795 C2 | 4/2002 |
| SU | 996324 A1 | 2/1983 |
| SU | 1175869 A1 | 8/1985 |
| WO | WO 83/00038 | 1/1983 |
| WO | WO 2001/016054 | 3/2001 |
| WO | WO 2002/086180 | 10/2002 |
| WO | WO 2004/094307 A1 | 4/2004 |
| WO | WO 2005/030391 | 4/2005 |
| WO | WO 2006/127017 A2 | 11/2006 |
| WO | WO 2008/102357 A2 | 8/2008 |
| WO | WO 2013/086273 | 6/2013 |
| WO | WO 2014/019880 A1 | 2/2014 |
| WO | WO 2014/144374 | 9/2014 |

OTHER PUBLICATIONS

Bae et al: "Roll-to-roll production of 30-inch graphene films fortransparent electrodes", Nature Nanotechnology, val. 5, No. 8, Aug. 1, 2010 (Aug. 1, 2010), pp. 574-578, XP055049935, ISSN: 1748-3387, DOI: 10.1038/nnano.2010.132.

Banhart, "Chains of carbon atoms: A vision or a new nanomaterial?", Beilstein J. of nanotechnology, vol. 6, (2015) pp. 559-569.

Bonaccorso et al., "Production and processing of graphene and 2d crystals", Materials Today, vol. 15(12), (2012) pp. 564-589.

Camargo et al., "Carbide-Derived Carbon by Electrochemical Etching of Vanadium Carbides", J. Electrochem. Soc.., 2015, 162, 10, H811-H815.

Carbon Nanomaterials, 2nd Ed., CRC Press, 2014, Chapter 11, "Carbide-Derived Carbon," (Y. Korenblit et al.), pp. 303-329.

Chen, Electrodeposition of Diamond-Like Carbon Films, Thesis, 2002, Univ. N. Texas*.

Chen et al., "Highly active and durable nanostructured molybdenum carbide electrocatalysts for hydrogen production", Energy Environ. Sci. 2013, 6, pp. 943-951.

Chen et al., "In Situ Synthesized $Al_4C_3$ Nanorods with Excellent Strengthening Effect in Aluminum Matrix Composites", Adv. Eng. Mat., 2014, vol. 16, No. 8, pp. 972-975.

Cherkasov et al., "Bomb calorimetry as a bulk characterization tool for carbon nanostructures", Carbon, vol. 63, pp. 324-329 (2013).

Chu et al., "Characterization of amorphous and nanocrystalline carbon films", Materials Chemistry and Physics, 96 (2006) pp. 253-277.

Cotton & Wilkinson, Ed., Advanced Inorganic Chemistry, 4th ed., 1980, pp. 361-363.

Dai et al., "Synthesis of nanostructured carbon by chlorination of calcium carbide at moderate temperatures and its performance evaluation", Mat. Chem. Phys., 112, 2, 2008, pp. 461-465.

De Oliveira et al., "Metal Matrix Composites Added of Nanostructured Tantalum Carbide", Sintering Techniques of Materials, 2015, Chapter 6, p. 107 (InTech).

Dimovski et al.; Synthesis of Graphite by Chlorination of Iron Carbide at Moderate Temperatures; J. Mater. Chem.; 14, 238-243 (2004).

El-Naas et al., "Solid Phase Synthesis of Calcium Carbide in a Plasma Reactor", Plasma Chemistry and Plasma Processing, 18, 3 (1998).

Fan et al. (Eds.) Silicon Carbide Nanostructures, Fabrication, Structure, and Properties, Springer International Publishing Switzerland, (2014) (Table of Contents).

Gogotsi et al., "Formation of $sp^3$-bonded carbon upon hydrothermal treatment of SiC", Diamond and Related Materials, vol. 5 (1996), pp. 151-162.

Gogotsi, (Ed.), Carbon Nanomaterials, 2006, Chapter 6, "Carbide-Derived Carbon," (G. Yushin et al.), pp. 211-254.

Gogotsi et al., "Nanoporous Carbide Derived Carbon with Tunable Pore Size", Nature Materials, vol. 2 (9), 2003, 591-594 (Retrieved from http://repository.upenn.edu/mse_papers/60).

Gulevich et al., "Technologies for hydrogen production based on direct contact of gaseous hydrocarbons and evaporated water with

(56) References Cited

OTHER PUBLICATIONS molten Pb or PB-Bi", Energy Conversion and Management, Elxwevier Sci. Pub. Oxford, GB, vol. 49 (7), Jul. 1, 2008, pp. 1946-1950.
Han et al., "Preparation of Carbon Nano-Onions and Their Applicatio as Anode Materials for Rechargeable Lithium-Ion Batteries", J. Phys. Chem. C2011,115, pp. 8923-8927.
He et al., "Fabrication of aluminum carbide nanowires by a nano-template reaction", Carbon, 48, (2010), pp. 931-938.
Kawamura et al, "Electrodeposition of cohesive carbon films on aluminum in a LiCl—KCl—K2CO3 melt", J. Appl. Electrochem., 30: 571 (2000).
Kosolapova, Carbides, Properties, Production, and Applications, Plenum Press, 1971.(Table of Contents).
Kraft et al., "Carbon formed by hydrothermal treatment of α-SiC crystals",J. Mater. Chem., vol. 10, (2000) pp. 671-680.
Kulak et al., "Electrodeposition of Nanostructured Diamond-like Films by Oxidation of Lithium Acetylide", Electrochemistry Communications, vol. 5, Issue 4, Apr. 2003, pp. 301-305.
Lukatskaya et al., Room-Temperature Carbide-Derived Carbon Synthesis by Electrochemical Etching of MAX Phases, Angew. Chem. Int. Ed. Engl., vol. 53, 19, pp. 4887-4880 (2014).
Morishita et al, "Carbon-coated tungsten and molybdenum carbides for electrode of electrochemical capacitor",Electrochemica Acta, 52, 7, Feb. 1, 2007, 2478.
Nishi et al., "Formation and magnetic characteristics of cobalt-carbon nanocluster magnets embedded in amorphous carbon matrices", Chem. Phys. Letters, 369, 1-2, 198-203 (2003).
Nuernberg et al., "Methane conversion to hydrogen and nanotubes on Pt/Ni catalysts supported over spinel MgAl2O4", Catalysis Today, vol. 176, Issue 1, Nov. 1, 2011, pp. 465-469.
Odegard et al.; On the Solubility of Aluminum Carbide and Electrodeposition of Carbon in Cryolitic Melts; J. Electrochem. Soc., 1088-1092; May 1987.
Pang et al., "Synthesis of Carbon Spheres via a Low-Temperature Metathesis Reaction", J. Phys. Chem. C, 2008, 112, 12134-12137.
Pillai et al., "Solid-State Synthesis of Calcium Carbide by Using 2.45 GHz Microwave Reactor", Ind. Eng. Chem. Res. 2015, 54(44) 11001-11010, 2015.
Presser, "Oxidation and Wet Wear of Silicon Carbide", PhD dissertation, Universität Tübingen, (2009).
Presser et al., "Carbide-Derived Carbons-from Porous Networks to Nanotubes and Graphine", Adv. Functional Mater., 21, 810-833, (2011).
S. Reynaud, "Fabrication and characterization of carbon and boron carbide nanostructured materials", PhD thesis, Rutgers Univ., 2010.
Rodygin et al., Calcium Carbide: A Unique Reagent for Organic Synthesis and Nanotechnology, Chem. Asian J., 2016, 11, 7, 965-976.
Schmuecker et al., "Formation Mechanism of Nanostructured Metal Carbides via Salt-Flux Synthesis", Inorganic Chemistry, 2015, 54(8), pp. 3889-3895.
Schnepp et al., Synthesis of Highly Magnetic Iron Carbide Nanoparticles via a Biopolymer Route, Chem. Mater. vol. 22(8), pp. 5340-5344 (2010).
Serban et al., "Hydrogen Production by Direct Contact Pyrolysis of Natural Gas", Fuel Chemistry Division Preprints, 2002, 47(2), 746.
Streletskii et al.,"Mechanochemical Actuvatuib of Aluminum. 4. Kinetics of Mechanochemical Synthesis of Aluminum Carbide", Colloid Journal, 2006, vol. 68, No. 4, pp. 470-480.
Sun et al., "Field nanoemitter: One-dimension Al4C3 ceramics", Nanoscale, 2011, 3, 2978-2982.
Sun et al., "Carbon-in-Al4C3 Nanowire Superstructures for Field Emitters", ACSNano, 2011, vol. 5, No. 2, 932-941.
Sun et al., "Synthesis of $Al_4C_3$ nanowalls via thermal evaporation and potential application in vacuum microelectronic devices as cold electron emitters", Cryst. Eng. Comm., 2012, 14, 7951-7957.
Vorozhtsov et al., "Synthesis, Structure, and Phase Composition of AL—$Al_4C_3$ Nanostructured Materials", Russian J. of Non-Ferrous Metals, 2012, 53, 5, pp. 420-424.

Wang et al., Hydrogen generation by direct decomposition of hydrocarbons over molten magnesiouum, J. of Molecular Catalysis A: Chemical 283 (2008) 153-157.
Wu et al.,"The effects of electrolyte on the supercapacitive performance of activated calcium carbide-derived carbon", Journal of Power Sources, vol. 226 (2013), pp. 202-209.
Xie et al., "Preparation of high purity carbon nanospheres by the chemical reaction of calcium carbide and oxalic acid", Carbon, 2009, 47, 2292-2295.
Xie et al., "Chemical reactions between calcium carbide and chlorohydrocarbon used for the synthesis of carbon spheres containing well-ordered graphite", Carbon 2010, 48, 2023-2029.
Xie et al., "Low temperature synthesis of high quality carbon nanospheres through the chemical reactions between calcium carbide and oxalic acid", Mater. Chem. Phys., 2010, 124, 482-487.
Yolshina et al., "A novel electrochemical method for the synthesis of boron doped graphene in the molten salt electrolyte", Synthetic Metals, 205 (2015): 85-91.
Zhang et al., "Lithium-Assisted Self Assembly of Aluminum Carbide Nanowires and Nanoribbons" Nano Letters, (2002), vol. 2(2), pp. 105-108.
Zheng et al., "The preparation and performance of calcium carbide-derived carbon/polyaniline composite electrode material for supercapacitors", J. Power Sources, 195, 6, Mar. 5, 2010, 1747.
International Searching Authority (ISA/US), International Application No. PCT/US14/028755, PCT International Search Report, dated Sep. 19, 2014, p. 1-3.
International Preliminary Report on Patentability received in connection with International Application No. PCT/US2014/028755 dated Sep. 15, 2015.
Invitation to pay additional fees and partial search report received in connection with international application No. PCT/US2015/056175; dated Feb. 12, 2016.
Osetzky, "Macrocrystalline Graphite From Magnesium Carbide", Carbon, vol. 12, pp. 517-523, (1974).
Fedorov et al., "Mesoporous carbon Adsorbents from Calcium Carbide", J. Appl. Chem. USSR, 54, 2253-2255, (1982).
Fedorov et al., "Theoretical Foundations of Carbide-Thermal Technology for Production of Activated Carbon and Sorption-Active Materials", Russ J. Appl. Chem., vol. 71, 584-588, (1998).
Fedorov et al., "Production, Pore Structure, Adsorption Properties, and Fields of Application of Composite Sorbents from Calcium Carbide", Russ. J. Appl. Chem., vol. 71, 795-798, (1998).
Ivakhnyuk, Z. Prikladnoi Khimii, 60, 852-856,1987.
Ivakhnyuk, Z. Prikladnoi Khimii, 60,1413-1415,1987.
Samonin, Z. Prikladnoi Khimii, 60,2357-2358,1987.
International Search Report and Written Opinion received in connection with, International Application No. PCT/US2015/056175, mailed.
Anonymous: "Graphit—Wikipedia", Jul. 15, 2014 (Jul. 15, 2014), XP055273296, Retrieved from the Internet: URL:https://de.wikipedia.org/w/index.php?title=Graphit&oldid=132168437 [retrieved on May 18, 2016].
Anonymous: "Graphene—Wikipedia, the free encyclopedia", Aug. 17, 2014 (Aug. 17, 2014), XP055273317, Retrieved from the Internet: URL:https://en.wikipedia.org/w/index.php title=Graphene&oldid=621692371 [retrieved on May 18, 2016].
Anonymous: "Diamond—Wikipedia, the free encyclopedia", Aug. 5, 2014 (Aug. 5, 2014), XP055273274, Retrieved from the Internet: URL:https://en.wikipedia.org/w/index.php title=Diamond&oldid=620007262 [retrieved on May 18, 2016].
Senthilnathan et al., "Synthesis of carbon films by electrochemical etching of SiC with hydrofluoric acid in nonaqueous solvents", Carbon, 71 (2014) pp. 181-189.
Morris et al.,. "Galvanic Cell Studies Involving Calcium Carbide Solutions", J. Electrochem. Soc., 1973, 120, 4, 570-575.
Boehm et al., "Structural Parameters and Molecular Sieve Properties of Carbons Prepared from Metal Carbides", Proc. 12th Biennial Conf. on Carbon, 149-150, Pergamon, Oxford, 1975.
Ke Wang, "The preparation of hydrogen over molten metal and the synthesis of methyl 3, 3-dimethytpropionate over homogeneous catalyst", thesis, Hunan University (2009)—in Chinese with English abstract.

(56) References Cited

OTHER PUBLICATIONS

Zhou et al., Unsupported nickel catalysts for methane catalytic decomposition, AIChE Journal, vol. 60(8), Aug. 2014, pp. 2907-2917 (Abstract only).
Supplemental European Search Report Received in connection with European Application EP 14764834.9 (dated Nov. 16, 2016).
Search report received in connection with Chinese Application No. CN201480025010.9; dated Jun. 27, 2016.
International Search Report and Written Opinion received in connection with International Application No. PCT/US2017/014955; dated Apr. 12, 2017.
Yushin et al., "Carbide Derived Carbon" in Nanomaterials Handbook, CRC Press, Jan. 26, 2006; Chpt 8.
Davenport, "Harry Kroto's last words on carbine", vol. 94, issue 20, pp. 8-10 (2016).
Khanna R., et al, "Formation of carbyne-like materials during low temperature pyrolysis of lignocellulosic biomass: A natural resource of linear sp carbons", Scientific Reports, 7, 1, (2017).
Davenport, "Contention Over Carbyne", vol. 93, issue 46, pp. 30-31 (2015).
Bitao Pan et al, "Carbyne with finite length: The one-dimensional sp carbon", Science Advances.
Casari, et al, "Carbyne: from the elusive allotrope to stable carbón atom wires", Department of Energy, Politecnico di Milano via Ponzio (2018).
Povov, A., Molecular Nanostructures, Carbon hybridization and allotropes.
Leduc et al., "Chemical and Electrochemical Oxidation of Aqueous Solutions of NADH and Model Compounds," Bioelectrochemistry and Bioenergetics, 1, 96-107 (1974).
Kikuti et al., "Chemical and Electrochemical Coloration of Stainless Steel and Pitting Corrosion Resistance Studies," J. Braz. Chem. Soc., vol. 15, No. 4, Jul./Aug. 2004.
Lunak et al. "One Electron vs. Two Electron Electrochemical and Chemical Oxidation of Electron-Donor Substituted Diketo-pyrrolopyrroles," Electrochemica Acta, 106, Sep. 1, 2013, 351-359. (Abstract only).
Zabik et al. "Selective Electrochemical versus Chemical Oxidation of Bulky Phenol," J. Phys. Chem. B, 2016, 120 (34), 8914-8924. (Abstract Only).
Inzelt (Ed.), "Chemical and Electrochemical Syntheses of Conducting Polymers," Conducting Polymers, Chapter 4, pp. 123-135, Springer 2008.
Anonoymous: "Calciumcarbid", Oct. 31, 2014 (Oct. 31, 2014), XP055475945,Retrieved from the Internet: URL:https://de.wikipedia.org/w/index.php?title=Calciumcarbid&oldid=133583939 [retrieved on May 16, 2018].
Anonymous: "Carbide", Oct. 12, 2014 (Oct. 12, 2014), XP055475952, Retrieved from the Internet: URL:https://en.wikipedia.org/w/index.php?title=Carbide&oldid=629275255 [retrieved on May 16, 2018].
Database WPI, Thormpson Scientific, London, GB, AN May 26, 2004, pp. 605110.
International Search Report and Written Opinion received in connection with International Application No. PCT/US2017/028405; dated Dec. 8, 2017.
Supplemental European Search Report Received in connnection with European Application EP 14764834.9 (dated May 12, 2017)—Replaces ESR of Nov. 16, 2016.
Search Report received in connection with Singapore Application No. 11201703092Q; dated Jul. 5, 2018.

\* cited by examiner

METHODS, APPARATUSES, AND ELECTRODES FOR CARBIDE-TO-CARBON CONVERSION WITH NANOSTRUCTURED CARBIDE CHEMICAL COMPOUNDS

BACKGROUND

Carbon materials and nanomaterials are an increasingly important area of materials science and technology. Examples of important carbon nanomaterials include, for example, fullerenes, carbon nanotubes, graphene, and nanocrystalline diamond. Carbide-to-carbon reactions and so-called "carbide-derived carbon" (CDC) are known in the art. However, better methods are needed to prepare and control such carbon materials, particularly at the nanoscale. Moreover, it is desirable if reaction conditions such as temperature and pressure can be mild and economically attractive. For example, some preparation methods suffer from a need for high or low temperatures, or high or low pressures, in addition to a lack of control over the product. Other preparation methods require use of chemical such as chlorine which raise environmental and health risks.

SUMMARY

Aspects and embodiment described herein include materials, methods of making materials, methods of using materials, and devices, apparatuses, and systems which comprise such materials.

A first aspect, for example, is a method comprising: providing at least one carbide chemical compound and reducing at least one reactant with use of the carbide chemical compound to form elemental carbon, wherein the carbide chemical compound is nanostructured.

A second aspect is a method comprising: producing elemental carbon material from the oxidation of carbide in at least one carbide chemical compound in at least one anode of an electrochemical cell apparatus, wherein the carbide chemical compound is nanostructured.

A third aspect is an apparatus comprising at least one electrochemical cell comprising: at least one anode comprising at least one carbide chemical compound, and at least one cathode, wherein the carbide chemical compound is nanostructured.

A fourth aspect provides for an electrode structure comprising at least one carbide chemical compound, wherein the carbide chemical compound is nanostructured.

Still further, a fifth aspect provides for a method comprising operating at least one anode in an electrochemical cell, wherein the anode comprises at least carbide chemical compound, wherein the carbide chemical compound is nanostructured.

Still further, a sixth aspect provides for a method comprising: producing elemental carbon material from the oxidation of carbide in at least one carbide chemical compound which is in contact with a melt comprising at least one salt comprising at least one metal cation which is reduced, wherein the carbide chemical compound is nanostructured.

Still further, a seventh aspect provides for a method comprising: producing elemental carbon material from the oxidation of carbide in at least one carbide chemical compound which is in contact with a solution comprising at least one organic solvent and at least one dissolved salt comprising at least one metal cation which is reduced, wherein the carbide chemical compound is nanostructured.

An eighth aspect is an elemental carbon material composition prepared by any of the methods described or claimed herein.

A ninth aspect is a method comprising: processing at least one carbide chemical compound into a nanostructured form of the carbide chemical compound.

A tenth aspect is a composition comprising, consisting essentially of, or consisting of nanostructured carbide chemical compound such as, for example, calcium carbide.

Additional embodiments of these various aspects are provided in the following detailed description and claims.

At least one advantage which results from at least one embodiment described herein is better control over the reaction and the reaction product including control at the nanoscale. This can provide for new forms of carbon for at least some embodiments.

DETAILED DESCRIPTION

Introduction

Figure 1:
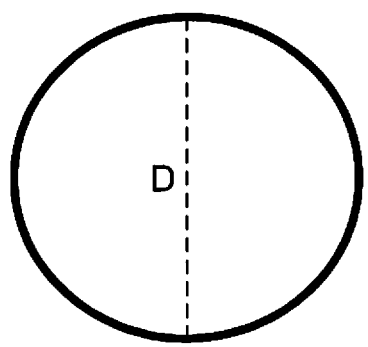
FIG. 1 illustrates in cross-section one embodiment for a nanostructured carbide chemical compound in nanoparticle form (D is diameter which will be less than 1,000 nm).

Further details of the various embodiments are provided herein.

References cited herein are incorporated herein by reference in the entirety. No admission is made that any of the references are prior art.

In addition, the claim transitions "comprising," "consisting essentially of," and "consisting of" can be used to describe and/or claim the various embodiments described herein, whether for methods, compositions, or apparatuses. Basic and novel features of the invention are described herein and allow for exclusion of components from claimed embodiments. Claims can be open, partially closed, or closed claims.

Carbide chemical compounds are known to be used in steel manufacturing, but an embodiment is that the methods and compositions described herein do not relate to the manufacture of steel.

Carbide-to-Carbon Conversion Reaction

The carbide-to-carbon conversion reaction, and related reactions, are generally known in the art as reflected in the following references, which are incorporated herein by reference in the entirety:

U.S. application Ser. No. 14/213,533, filed Mar. 14, 2014 and published as 2014/0271441, describes a method of making carbon from carbide and molten, metal salts in a thermal process but at relatively low temperature compared to prior art processes. PCT Application PCT/US2014/028755, filed Mar. 14, 2014 and published as WO 2014/144374, also describes a method of making carbon from carbide and molten, metal salts in a thermal process but at a relatively low temperature. Also described are processing steps to purify and treat the elemental carbon material. FIGS. 6 and 7 show examples of elemental carbon materials prepared by these methods;

U.S. patent application Ser. No. 14/886,319 filed Oct. 19, 2015 described a method for making carbon from carbide at mild temperature and pressure, including use of an electrochemical apparatus at room temperature and pressure, as well as use of a solvent process. Application Ser. No. 14/886,319 describes embodiments for methods of making the carbon, apparatuses for making the carbon, carbide electrodes, reaction products, post reaction processing, and applications which are supported by figures, data, and working examples, all of which is incorporated herein by reference in its entirety;

Y. Gogotsi, (Ed.), *Carbon Nanomaterials*, 2006, Chapter 6, "Carbide-Derived Carbon," (G. Yushin et al.), pp. 211-254;

*Carbon Nanomaterials*, 2$^{nd}$ Ed., CRC Press, 2014, Chapter 11, "Carbide-Derived Carbon," (Y. Korenblit et al.), pp. 303-329;

D. Osetzky, *Carbon*, 12, 517-523, 1974;

N. F. Fedorov, et al., *J. Appl. Chem. USSR*, 54, 2253-2255, 1981;

N. F. Federov, et al., *Russ J. Appl. Chem.* 71, 584-588, 1998;

N. F. Federov, et al., *Russ. J. App. Chem.* 71, 795-798, 1998;

(Russian) Ivakhnyuk, *Z. Prikladnoi Khimii*, 60, 852-856, 1987 ("Carbon enriched calcium carbide and possibility of its application");

(Russian) Ivakhnyuk, *Z. Prikladnoi Khimii*, 60, 1413-1415, 1987 ("Study of properties of carbon derived from calcium carbide in the presence of nitrogen");

(Russian) Samonin, *Z. Prikladnoi Khimii*, 60, 2357-2358, 1987 ("On mechanism of interaction between calcium carbide and metal chlorides");

SU patent 996324;

SU patent 1175869;

Han et al., *J. Phys. Chem.*, 2011, 115, 8923-8927;

U.S. Pat. No. 3,066,099;

Dai et al., *Mat. Chem. Phys.*, 112, 2, 2008, 461-465 ($CaC_2$-CDC, nanostructured carbon by chlorination of CaC at moderate temperatures);

Carbide-derived carbon (CDC) is described in the patent literature including, for example, U.S. Patent Publications 2001/0047980; 2006/0165584; 2006/0165988; 2008/0219913; 2009/0036302; 2009/0117094; 2009/0258782; 2009/0301902;

In addition, DE 1667532 Greiner (1971) describes what is said to be low temperature diamond production from an electrochemical system which can include use of carbide in the electrolyte with use of temperatures of 600° C. to 1000° C. However, no data are provided;

Also, U.S. Pat. No. 4,738,759 (1988) describes an electrolysis process wherein calcium carbide can be subjected to electrolysis to form graphite sponge at the anode. Temperatures are used such as 700° C. to 1,000° C.;

A Chen M. S. thesis, August 2002, Univ. N. Texas, describes electrochemical deposition of films of amorphous carbon and diamond like carbon (DLC). Electrochemical deposition was carried out using a low temperature (less than −40° C.) solution of acetylene in liquid ammonia;

Kulak, *Electrochem. Comm.*, 5, 2003, 301-305 describes room temperature electrodeposition of very thin, porous film containing carbon (50-100 nm thick) from a solution of lithium acetylide. However, the microscopic images of the film indicate a low quality material (FIG. 2) and much of the film is not carbon apparently;

U.S. 2011/0290655 (Nishikiori; Toyota) describes a method for electrochemically depositing carbon film on an anode substrate using a molten salt electrolyte bath comprising a carbide ion and applying a DC voltage to deposit the carbon film. The bath temperature is 250° C. to 800° C. The carbon film is said to be mainly amorphous carbon including graphite-like carbon according to x-ray diffraction.

Carbide Chemical Compound

Carbide chemical compounds or "carbides" are generally known in the art. See, for example, Cotton & Wilkinson, *Advanced Inorganic Chemistry*, 4$^{th}$ Ed., 1980, pages 361-363; and Kosolapova, *Carbides, Properties, Production, and Applications*, Plenum Press, 1971. This text classifies types of carbides as saltlike carbides, interstitial carbides, and covalent carbides. Carbides can also include other elements such as oxygen in oxycarbides (see, for example, U.S. Pat. Nos. 6,514,897 and 5,599,624).

Known carbide chemical compounds include, for example, aluminum, arsenic, beryllium, boron, calcium, chromium (in five different Cr:C ratios), cobalt, hafniuim, iron (in seven different Fe:C ratios), lanthanum, manganese (in two different Mn:C ratios), magnesium (in two different Mg:C ratios), molybdenum (in three different Mo:C ratios), nickel (in two different Ni:C ratios), niobium (in two different Nb:C ratios), plutonium (in two different Pu:C ratios), phosphorous, scandium, silicon, tantalum (in two different Ta:C ratios), thorium (in two different Th:C ratios), titanium, tungsten (in two different W:C ratios), uranium (in two different U:C ratios), vanadium (in two different V:C ratios), and zirconium carbide. Also, a carbide can form with two different metals such as cobalt tungsten carbide.

In one embodiment, the carbide chemical compound is a salt-like carbide or an intermediate transition metal carbide. More particularly, the carbide chemical compound is a salt-like carbide in one embodiment. In another embodiment, the carbide chemical compound is a methanide, an acetylide, or a sesquicarbide.

Methanides react with water to produce methane. Methane is a carbon atom bonded to four hydrogen atoms in an sp3 hybridization. Two examples of methanides are aluminum carbide ($Al_4C_3$) and beryllium carbide ($Be_2C$). Acetylides are salts of the acetylide anion $C_2^{-2}$ and also have a triple bond between the two carbon atoms. Triple bonded carbon has an sp1 hybridization and two examples of acetylides are sodium carbide ($Na_2C_2$) and calcium carbide ($CaC_2$). Sesquicarbides contain the polyatomic anion $C_3^{-4}$ and contains carbon atoms with an sp1 hybridization. Two examples of sesquicarbides are magnesium carbide ($Mg_2C_3$) and lithium carbide ($Li_4C_3$).

Sesquicarbides are of particular use for the preparation of sp1 carbon. One can produce $Mg_2C_3$ in the laboratory by bubbling methane through molten magnesium metal under an inert argon atmosphere at over 750° C. Other hydrocarbons such as pentane may also be viable candidates. Also, molten magnesium (Mg) reaction is another area of chemistry where little has been conducted. Research in molten Mg reactions have been limited because of the dangers associated with molten Mg, especially with the process generating hydrogen gas as well. But a process very similar to the synthesis of the magnesium sesquicarbide can be used to convert methane directly into carbon in the form of graphite and hydrogen gas. Methane can be bubbled through a molten solution of Mg and magnesium chloride salt. When heated to a temperature of over 750° C. under an argon atmosphere the elemental Mg metal and $MgCl_2$ both melt to form a liquid solution. Similar to the Mg sesquacarbide synthesis, methane is bubbled through the solution to produce either $MgC_2$ (magnesium carbide) or $Mg_2C_3$ and hydrogen gas that can be collected as a value added product. The carbide then reacts with the metallic salt based on the original chemistry of the carbon producing carbide reaction. The $Mg_2C_3$ and $MgCl_2$ are converted to elemental carbon in the form of graphite, elemental Mg metal and $MgCl_2$, which would remain as part of the liquid solution. Therefore, the Mg metal and $MgCl_2$ salt would remain unchanged throughout the overall process while the methane would be converted to pure carbon and hydrogen gas.

In particular embodiments, the carbide chemical compound is calcium carbide, aluminum carbide, sodium carbide, magnesium carbide, lithium carbide, beryllium carbide, iron carbide, copper carbide, and chromium carbide. Sodium carbide has the advantage of being lighter.

In other more particular embodiments, the carbide chemical compound is calcium carbide or aluminum carbide. Calcium carbide is particularly preferred.

In another embodiment, the carbide chemical compound has sufficient electronic conductivity to function as or in an anode. The conductivity for different carbides can vary depending on factors such as purity and temperature. However, one skilled in the art for a particular application can determine whether there is sufficient electronic conductivity and how to adapt the conductivity for the need. For example, the carbide chemical compound can have an electronic conductivity of at least $10^{-8}$ S/cm, or at least $10^{-7}$ S/cm, or at least $10^{-6}$ S/cm, or at least $10^{-5}$ S/cm, or at least $10^{-4}$ S/cm, or at least $10^{-3}$ S/cm, or at least $10^{-2}$ S/cm, or at least $10^{-1}$ S/cm, or at least $10^0$ S/cm. The electronic conductivity of calcium carbide provides a useful benchmark for sufficient conductivity. No particular upper limit is present except for the limits provided by nature for a particular carbide.

The form of the carbide chemical compound can also be varied as described herein with respect to it being nanostructured.

The carbide chemical compound can be used in compositions and mixed with other ingredients such as binders or conductivity agents to the extent the desired reaction can be achieved. In some embodiment, more than one carbide chemical compound can be used.

One can use an electronically conductive binder to hold the pieces or particles of carbide together. This can, for example, increase the surface area of the carbide which is in direct contact with a conductive surface. Electronically conductive binders also can be selected as a way to produce composite materials where the conductive properties and other characteristics of the binder can be used to change the characteristics of elemental carbon material produced. Examples of electronically conductive binders include conjugated polymers in doped or undoped form such a polythiophene or a polyaniline. Polymeric binders can be used.

In one embodiment, the carbide chemical compound can be part of an ink system involving a solvent vehicle. The solvent can be an organic solvent or water, and mixtures of solvents can be used. Additives can be used. Nanoparticles can be suspended in the vehicle and stabilizers can be used. An ink can be useful for processing and forming films.

In one embodiment, the carbide chemical compound is not a covalent carbide and in another embodiment is not silicon carbide.

The purity of the carbide chemical compound can be made as high as possible, including, for example, at least 80 wt. %, or at least 85 wt. %, or at least 90 wt. %, or at least 95 wt. %, or at least 99 wt. %.

Some carbide chemical compounds are commercially available as "nanopowders." These include, for example, TiC, SiC, tungsten(IV)C, $Cr_3C_2$, TaC, VC, and ZrC.

The crystallinity of the carbide chemical compound is not particularly limited, whether of uniform or mixed morphology, whether single crystal, polycrystalline, nanocrystalline, or amorphous.

In a preferred embodiment, the carbide chemical compound is calcium carbide. The manufacture of calcium carbide from a carbon source and a calcium source is well-known, particularly at a large manufacturing scale. Calcium carbide is produced typically at very high temperatures as a melt phase and then cooled into larger slabs which are then crushed into particles and classified by particle size. An electric arc furnace is typically used to generate the high temperatures. Calcium carbide is well-known to be reactive to water to form acetylene, and steps can be taken to keep the calcium carbide away from moisture and air. Because of its reactivity with moisture to form acetylene, calcium carbide can present an explosion or fire hazard if not handled properly.

Other methods are available to make calcium carbide such as in a microwave reactor (Pillai et al., *Ind. Eng. Chem. Res.*, 2015, 54(44), 1001-11010, 2015).

The reaction of calcium carbide with acetylene has been reported to useful to produce carbon nanoparticles (Rodygin et al., *Chem. Asian J.*, 2016, 11, 7, 965-976).

The methods of carbide production can be adapted to provide for nanostructured forms of the carbide chemical compound. The carbide chemical compound can be formed directly in nanostructured form, or after formation, it can be processed into the nanostructured form.

Nanostructured

The carbide chemical compound is nanostructured ("nanostructured carbide chemical compound"), which is a term generally known in the art. Nanostructures can take various forms including, for example, one-dimensional, two-dimensional, and three-dimensional forms as known in the art. In one embodiment, the carbide chemical compound is nanostructured in one dimension (e.g., a nanofilm); in another embodiment, the carbide chemical compound is nanostructured in two dimensions (e.g., a nanorod or a nanowire); and in another embodiment, the carbide chemical compound is nanostructured in three dimensions (e.g. a nanoparticle). Nanostructured carbide chemical compounds are known in the art as described in references cited herein (e.g., *Silicon Carbide Nanostructures, Fabrication, Structure, and Properties*, (Fan, Chu, Eds.), 2014, describing nanoparticles, nanowires, nanotubes, and nanofilms). Nanostructured and nanostructure does not mean normal, inherent surface features on a nanoscale which are present in any solid material surface including a solid carbide chemical compound. Rather, nanostructured and nanostructures are engineered into the material through formation of, for example, nanoparticles, nanowires, or nanofilms.

A wide variety of nanostructures are known in the art. The nanostructures can be, for example, nanoparticles, nanopowders, nanoclusters, nanofibers, nanowires, nanotubes, nanofilms, nanolines, nanohorns, nanowhiskers, nanoonions, nanoplatelets, nanorods, nanosheets, nanorings, nanobelts, nanodiscs, nanotowers, and nanoshells. Some of these terms can be considered subsets of other terms. In preferred embodiments, the nanostructured carbide chemical compound is in the form of at least one nanoparticle, at least one nanowire, at least one nanotube, at least one nanofilm, or at least one nanoline.

As used herein, a nanowire can be hollow or non-hollow, and a hollow nanowire can be also called a nanotube. As used herein, a nanowire having a shorter aspect ratio (length/width) can be called a nanorod. An aspect ratio of ten can be used to distinguish the nanorod form of a nanowire from a nanowire which is not a nanorod, but for purposes herein nanorods are also nanowires. As used herein, a nanofilm can be a nanoline if the nanofilm has a length much longer than the width, such as a length which is two, three, or four, or more times longer than the width.

The nanostructure can be characterized by a dimension such as 1 nm to 1,000 nm, or 1 nm to 500 nm, or 1 nm to 250 nm, or 1 nm to 100 nm, or 1 nm to 50 nm, or 100 nm to 1,000 nm, or 100 nm to 500 nm, or 100 nm to 250 nm, or 250 nm to 500 nm, or 500 nm to 1,000 nm. The dimension can represent, for example, a diameter or an average diameter or width, or a thickness or an average thickness.

There is no particular upper or lower limit on the volume of a particular nanostructure, but the volume can be, for example, less than 20 cubic micron, or less than 10 cubic micron, or less than one cubic micron, or less than 0.8 cubic micro, less than 0.6 cubic micron, or less than 0.4 cubic micron, or less than 0.2 cubic micron, or less than 0.5 cubic micron, or less than 0.001 cubic micron.

Mixtures of nanostructures can be used. For example, nanoparticles can be mixed with nanowires, nanotubes, or nanorods.

The nanostructures can be porous or non-porous.

In one embodiment, the nanostructured carbide chemical compound is mixed with at least one other different material. The different material can be within the nanostructure or it can be in a separate structure such as a separate particle or wire. In one embodiment, the nanostructured carbide chemical compound is held in a matrix material. The nanostructures can be compacted before use.

Nanostructuring of the carbide chemical compound can be carried out with methods going back to the synthesis of the carbide chemical compound. For example, if the carbide chemical compound is prepared in a melt state or a soft state, it can be processed in this melt or soft state. Molding and pressing operations can be used. Molds can be adapted to be nanostructured. Steps can be taken to reduce exposure of the carbide chemical compound to air, oxygen, and moisture as it is formed. In particular, processes for forming calcium carbide can be adapted to introduce a nanostructured form. For example, U.S. Pat. No. 1,889,951 describes a method for cooling calcium carbide, for example, and this method can be adapted. U.S. Pat. No. 3,201,052 also describes a process for crushing and cooling calcium carbide blocks. U.S. Pat. No. 4,508,666 also describes a process for cooling and comminuting molten calcium carbide.

El-Naas et al., *Plasma Chemistry and Plasma Processing*, 18, 3 (1998) describes a solid-phase synthesis of calcium carbide in a plasma reactor using fine particle reactants to provide a granular product with finer particle size. For example, calcium oxide can have a 170 micron particle size and graphite can have a 130 micron particle size.

Additional patent literature for calcium carbide includes 2011/0123428; 2002/0197200; 2005/0170181; 2014/0311292; and 2005/0171370. Known methods can be adapted to form nanostructures in the nanostructured carbide chemical compound.

Nanoparticle

Nanoparticles are generally known in the art. The nanoparticles can be characterized both by looking at an individual nanoparticle and also looking at collections of pluralities of nanoparticles, and use of statistics to characterize the collection. The nanoparticles can be characterized by a diameter which is nanostructured. Mixtures of nanoparticles can be used. Methods known in the art such as SEM and TEM methods can be used to measure particle size, shape, and diameter. The particle shape can be generally spherical, or it can be somewhat elongated and not spherical.

For example, in one embodiment, the nanostructured carbide chemical compound is in the form of at least one nanoparticle, wherein the at least one nanoparticle is part of a collection of nanoparticles of the carbide chemical compound having an average diameter of 1 nm to 1,000 nm.

In another example, the nanostructured carbide chemical compound is in the form of at least one nanoparticle, wherein the at least one nanoparticle is part of a collection of nanoparticles of the carbide chemical compound having an average diameter of 100 nm to 1,000 nm.

In another example, the nanostructured carbide chemical compound is in the form of at least one nanoparticle, wherein the at least one nanoparticle is part of a collection of nanoparticles of the carbide chemical compound having an average diameter of 1 nm to 100 nm.

In another example, the nanostructured carbide chemical compound is in the form of at least one nanoparticle, wherein the at least one nanoparticle is part of a collection of nanoparticles of the carbide chemical compound having an average diameter of 500 nm to 1,000 nm.

In another example, the nanostructured carbide chemical compound is in the form of at least one nanoparticle, wherein the at least one nanoparticle is part of a collection of nanoparticles of the carbide chemical compound having an average diameter of 1 nm to 500 nm.

In another embodiment, the nanostructured carbide chemical compound is in the form of at least one nanoparticle, wherein the at least one nanoparticle is part of a collection of microparticles of the carbide chemical compound and nanoparticles of the carbide chemical compound.

In another embodiment, the nanostructured carbide chemical compound is in the form of at least one nanoparticle, wherein the at least one nanoparticle is part of a collection of nanoparticles of the carbide chemical compound which are bound together with a binder.

In one embodiment, the nanostructured carbide chemical compound is in the form of at least one nanoparticle, wherein the at least one nanoparticle is part of a collection of nanoparticles of the carbide chemical compound which are bound together with an electronically conductive binder.

In another embodiment, the nanostructured carbide chemical compound is in the form of at least one nanoparticle, wherein the at least one nanoparticle is part of a collection of nanoparticles of the carbide chemical compound which are bound together with a polymeric binder.

In one embodiment, the nanostructured carbide chemical compound is in the form of agglomerated nanoparticles.

In a particularly preferred embodiment, the nanoparticles are calcium carbide nanoparticles.

Nanoparticles can be formed by grinding processes which reduce the particle size to the desired nanodimension. Also, a collection of particles can be separated or classified so that a nanoparticle portion can be isolated from larger particles such as microparticles.

One process for grinding particles is the Union process which includes fine grinding done at micron, sub-micron, and nanoscale levels. Wet grinding and dry grinding can be carried out. See equipment and literature available from Union Process, Inc. (Akron, Ohio).

CN1498976 describes a "desulfurizer based on nanocomposite calcium carbide and calcium oxide for steel. Briefly, it describes a nano-class composite calcium carbide (or calcium oxide)-based desulfurizing agent for steel which contains calcium carbide or calcium oxide nanoparticles (65-95 wt. %), calcareous high-Al cement clinker, and a series of powders. The high energy Union Process (Ohio) can be used with an agitating mill with 2 micron particles crushed to 100 nm-class products.

U.S. Pat. No. 7,025,945 describes preparation of calcium carbide minute powder having particle size of several microns or below made mechanically.

U.S. Pat. No. 2,323,597 describes a multistage, continuous process for grinding calcium carbide.

Vorozhtsov et al. describes $Al_4C_3$ nanoparticles made by hot compaction (*Russian J. of Non-Ferrous Metals*, 2012, 53, 5, 420).

Streletskii et al., describe mechanochemical synthesis of aluminum carbide fine powder.

$Fe_3C$ nanoparticles are described in *Chemistry of Materials*, 2010, 22(18), 5340-5344.

Nanostructured $Mo_2C$ nanoparticles are described in, Chen et al., *Energy Environ. Sci.* 2013, 6, 943.

Nanostructured TaC is described in, for example, de Oliveira et al., *Sintering Techniques of Materials*, 2015, Chapter 6, p. 107 (InTech).

Nanostructured clusters of carbides are described in U.S. Pat. No. 7,025,945 and U.S. Patent Publication 2004/0028948. See also Nishi et al., Chem. Phys. Letters, 369, 1-2, 198-203 (2003).

An example of a nanoparticle with diameter D is shown in cross-section in FIG. 1, showing an idealized spherical embodiment.

Nanowires/Nanotubes/Nanorods

Nanowires, nanorods, and nanotubes are generally known in the art. The diameter of the nanowire or nanotube can be a nanodimension. The aspect of these structures (length to diameter ratio) may be relatively low compared to conventional nanowire or nanotube structures, and if less than ten, the nanowire can also be called a nanorod. Also, the carbide chemical compound can be mixed with one or more other materials that facilitate production into a nanowire, or nanotube form, helping to allow for elongation.

In one embodiment, the nanostructured carbide chemical compound is in the form of at least one nanowire.

In one embodiment, the nanostructured carbide chemical compound is in the form of at least one nanowire, wherein the at least one nanowire is part of a collection of nanowires having an average diameter of 1 nm to 1,000 nm.

In one embodiment, the nanostructured carbide chemical compound is in the form of at least one nanowire, wherein the at least one nanowire is part of a collection of nanowires having an average diameter of 1 nm to 100 nm.

In one embodiment, the nanowire has an aspect ratio of less than ten, such as 3 to 10. In another embodiment, the aspect ratio is greater than ten.

In another embodiment, the nanostructured carbide chemical compound is in the form of at least one nanotube.

In another embodiment, the nanostructured carbide chemical compound is in the form of at least one nanotube, wherein the at least one nanotube is part of a collection of nanotubes having an average diameter of 1 nm to 1,000 nm.

In another embodiment, the nanostructured carbide chemical compound is in the form of at least one nanotube, wherein the at least one nanotube is part of a collection of nanotubes having an average diameter of 1 nm to 100 nm.

Particularly preferred embodiments are calcium carbide nanofibers, calcium carbide nanowires, or calcium carbide nanotubes, or calcium carbide nanorods.

Nanowires can be prepared by drawing processes.

Chen et al., describe $Al_4C_3$ nanorods (*Adv. Eng. Mat.*, 2014, 16, 8).

Sun et al., describe $Al_4C_3$ one-dimensional nanostructures including nanowires (*Nanoscale*, 2011, 3, 2978).

Sun et al., describe $Al_4C_3$ one-dimensional nanostructures including nanowires (ACSNano, 2011, 5, 2, 2011).

He et al, describe fabrication of aluminum carbide nanowires by a nano-template reaction (*Carbon*, 48, 2010, 931).

CN101125652 describes a method for synthesizing aluminum carbide nanobelts.

Zhang et al. describe a self-assembly process for making aluminum carbide nanowires and nanoribbons.

U.S. Pat. No. 6,514,897 describes nanorods having carbides and/or oxycarbides.

Schmueck et al. describe making nanostructured metal carbides via salt flux synthesis, including making V8C7 (*Inorganic Chemistry*, 2015, 54(8) 3889.

Figure 2:
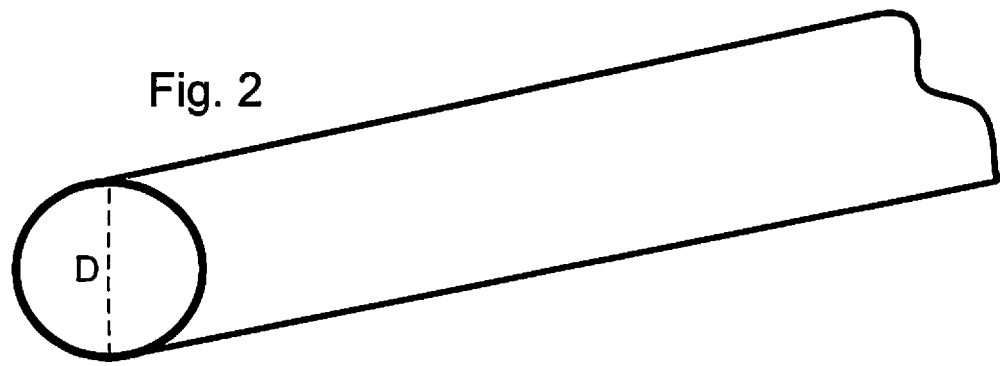
FIG. 2 illustrates in perspective view one embodiment for a nanostructured carbide chemical compound in an elongated form, including a nanowire (D is width which will be less than 1,000 nm).

An example of a nanowire is shown in a perspective view in FIG. 2, showing an idealized spherical representation with diameter D.

Nanofilms and Nanolines

Nanofilms and nanolines are generally known in the art. Here, the thickness dimension can be nanostructured. The line can be linear or curved as in curvilinear.

In one embodiment, the nanostructured carbide chemical compound is in the form of at least one nanofilm.

In one embodiment, the nanostructured carbide chemical compound is in the form of at least one nanofilm, and the nanofilm is in the form of a nanoline, wherein the line has a line width of 1 mm or less.

In one embodiment, the nanostructured carbide chemical compound is in the form of at least one nanofilm having an average film thickness of 1 nm to 1,000 nm.

In one embodiment, the nanostructured carbide chemical compound is in the form of at least one nanofilm having an average film thickness of 1 nm to 100 nm.

In one embodiment, the nanostructured carbide chemical compound is in the form of at least one nanofilm which is disposed on a substrate. The substrate can be inorganic or organic material, and can be, for example, glass, metal, polymeric, ceramic, composite, or other types of materials. The nanofilms and nanolines can be disposed by deposition on a solid substrate including a substrate made of inorganic or organic material. Patterning of the nanofilm or nanoline can be carried out.

In a particularly preferred embodiment, the nanofilms and nanolines are calcium carbide nanofilms and calcium carbide nanolines.

Nanofilms can be made by pressing molten forms of the carbide chemical compound. Another method is thin film deposition methods on a substrate such as sputtering, chemical vapor deposition, ion implantation, and the like.

Sun et al. describe $Al_4C_3$ nanowalls (*Cryst. Eng. Comm.*, 2012, 14, 7951).

S. Reynaud describes preparation of boron carbide nanostructured materials made by sputtering of thin films (PhD thesis, Rutgers Univ., 2010).

Figure 3:
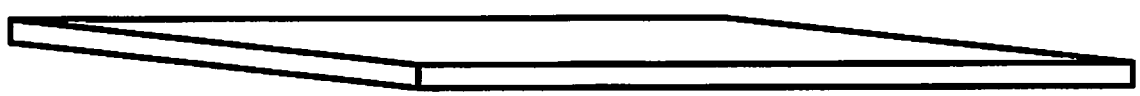
FIG. 3 illustrates one embodiment for a nanostructured carbide chemical compound in a nanofilm form. The film thickness will be less than 1,000 nm.

An examples of a nanofilm is shown in a perspective view in FIG. 3.

Oxidation/Reduction Reaction; Reaction Conditions

The oxidation and reduction reactions can be carried out under a variety of reaction conditions including temperature and pressure. A reactant is used along with the nanostructured carbide chemical compound. Many reaction conditions and the apparatuses and reaction vessels to carry out the reactions are described in patent applications cited herein including Ser. No. 14/886,319 and PCT Application PCT/US2014/028755. Several lead embodiments include use of an electrochemical approach, use of a melt approach, and use of a solvent approach, which are described more hereinbelow. The electrochemical and solvent approaches are particularly described in U.S. Ser. No. 14/886,319, and melt approaches are particularly described in PCT Application PCT/US2014/028755. A reactant is used which is reduced as the nanostructured carbide chemical compound is oxidized. The reactant can be, for example, a metal salt in which the metal cation is reduced from the electrons of the oxidizing carbide. In some embodiments, the carbide chemical compound can be in direct, physical contact, wherein for example, the reactant is in a melt or solution phase and is in direct, physical contact with the carbide chemical compound. In other embodiments, the reactant and carbide chemical compound cannot be in direct, physical contact, but indirectly linked via an electrically conductive pathway in an electrochemical cell.

Relatively low temperatures, including room temperature, can be used for the reaction to form carbon. For example, the temperature can be, for example, about −50° C. to about 100° C., or about 10° C. to about 90° C., or about 0° C. to about 50° C., or about 15° C. to about 50° C. The temperature can be, for example, about 20° C. to about 30° C., or about 23° C., 24° C., or 25° C. In some embodiments, one will want if possible to avoid the expense of cooling, heating, and temperature control elements. In some embodiments, one will want to run the reaction as close to ambient as possible. As known in the art, in a larger manufacturing operation, excess heat from one point in the operation can be transferred to another point in the operation which needs heat.

In other embodiments, the reducing is carried out at a temperature of less than about 400° C., or at a temperature of about 15° C. to about 400° C. In other embodiments, the reducing is carried out at a temperature of less than about 300° C.

In some embodiments, the methods described herein are undertaken at room temperature.

Moisture free, air free, oxygen free environments can be used for the reaction, and inert gases can be used.

The pressure can be about 1 atmosphere (760 torr) or normal pressure. The pressure can be, for example, about 720 torr to about 800 torr. Alternatively, the pressure can be for example about 0.5 atmosphere to about 5 atmosphere, or about 0.9 atmosphere to about 1.1 atmosphere. In some embodiments, one will want if possible to avoid the expense of using pressures below or above normal atmospheric ambient pressure. One can use a higher pressure to control the boiling point of the solvent. However, the equipment must be adapted to sustain high or low pressures.

A preferred embodiment is that temperature and pressure both are about ambient so than expensive methods to control temperature and pressure are not needed. Hence, for example, the temperature can be about 20° C. to about 30° C., or about 25° C., and the pressure can be about 720 torr to about 800 torr, or about 760 torr.

Other method parameters for the reduction reaction can be varied. For example, in one embodiment, one or more materials used in the process can be recycled. The material can be purified as part of the recycling. For example, solvent can be distilled and recaptured for further use. Salts can be recaptured and reused.

In another embodiment, the current flow from a process reactor to make carbon which is run as a galvanic cell can be used to help power another process reactor, including one used to make elemental carbon material, in which current is needed to help control the voltage.

The percent yield of the reaction for elemental carbon material product can be controlled by the amount of current flow and the methods of isolation as known in the art. Percent yield can be measured with respect to the amount of carbon in the carbide chemical compound put in the reactor. In some cases, the yield is at least one percent, or at least 5%, or at least 10%, or at least 20%.

Reactant; Metal Salt

The reactant can be, for example, a moiety which can be reduced such as at least one metal salt, and metal salts are well-known in the art, comprising a metal cation and an anion. Organic reactants can also be used, in principle, if the redox potentials allow for reaction. The reactant is selected to react well with the nanostructured carbide chemical compound to achieve the intended goal for the particular application (e.g., carbon production).

In one embodiment, the reactant is selected to function in an electrochemical reaction. In another embodiment, the reactant is selected to function in a melt reaction. In another embodiment, the reactant is selected to function in a solution reaction.

In the electrochemical approach, the nanostructured carbide chemical compound is used in the form of an anode and used in conjunction with a cathode where the reactant is reduced. For example, the cathode can be used in conjunction with a solution comprising a dissolved salt including a metal cation and an anion. In principle, any ion/metal combination where the ion can be reduced to the metal can be used for a cathode employing this method. More specifically, in principle, any elemental metal immersed in a solution containing ions of that metal, where the ions can be reduced to the elemental state in order to facilitate the oxidation of the carbide ions to elemental carbon, can be used. Examples include zinc metal in a solution of zinc ions, tin metal in a solution of stannous ions, silver metal in a solution of silver ions, and iron in a solution of ferrous ions. In selecting the cathode, practical considerations can be taken into account. For example, issues like corrosion of the metal cathode can be considered. Other factors to consider include, for example, the characteristics of the solvent and the overall solution and how they would interact with the different components of the reaction system. Solubility of the various metallic salts in the different solvents or solvent combinations would also be an issue.

In one embodiment, the electrochemical cell (e.g., galvanic cell) apparatus further comprises at least one metal cathode, wherein the cathode is a zinc, tin, iron (include steel), copper, or silver metal cathode. In another embodiment, the electrochemical cell (e.g., galvanic cell) apparatus further comprises at least one metal cathode, wherein the cathode is a zinc or tin metal cathode.

In one embodiment, the galvanic cell apparatus anode is contacted with at least one first solution comprising at least one first solvent and at least one first salt and a galvanic cell apparatus cathode is also contacted with at least one second solution comprising at least one second solvent and at least one second salt. The solvent and salt combination for both the anode and cathode sides of the cell should provide sufficient ionic conductivity for the process to be enabled. The viscosity of the solvent can be also considered in solvent selection for first and second solvent. For first and second solvent, the solvent can be, for example, a polar organic solvent such as an alcohol such as methanol or ethanol, or an ether such as tetrahydrofuran, or an aprotic solvent such as DMSO or NMP. Examples of solvents include N-methyl pyrrolidone, dimethyl formamide, acetone, tetrahydrofuran, pyridine, acetonitrile, methanol, ethanol, tetramethylurea, and/or dichlorobenzene. Mixtures of solvents can be used. In general, water is avoided in the solvent, and solvents can be dried. In some cases, slow reaction between the solvent and the carbide chemical compound may occur. For example, methanol can reaction with calcium carbide to form calcium methoxide. Typically, the reaction apparatus should be relatively inert to the solvent so that side reactions are minimized or avoided.

The salts for the cathode and anode sides of the cell can be selected to provide the cation or the anion which enable the reaction to work well. For example, the cathode metal being reduced can be used in conjunction with a salt which has the oxidized metal as cation. The anion of the salt can be a halide such as fluoride, chloride, bromide, or iodide. However, the fluoride can cause a high heat of reaction which can generate problems so fluoride salts can be avoided. Chloride salts generally are preferred. Examples of salts include zinc chloride, calcium chloride, stannous chloride, ferrous chloride, cupric chloride, silver chloride, aluminum chloride, lithium chloride, calcium fluoride, stannous fluoride, aluminum fluoride, and lithium fluoride.

An important factor also is that the cation of the carbide must form a soluble salt with the anion of the cathode cell. This may not be possible in some cases such as some sulfate salts including calcium sulfate.

Electrochemical Cell Method

The electrochemical embodiments are described further. The method of making can be based on a electrochemical cell apparatus which can be galvanic (spontaneous reaction) or electrolytic (non-spontaneous reaction). Preferably, the method makes use of a galvanic reaction using a galvanic cell apparatus. Preferably, the reaction is a spontaneous redox reaction. A galvanic reaction is generally known in the art as a spontaneous redox reaction wherein one moiety is oxidized and another moiety is reduced. The moieties are connected electrically to allow current to flow and the redox reaction to occur. A multimeter can be used to measure voltage and current flow for such a reaction. No external electrical potential is needed to induce the spontaneous reaction in a galvanic reaction. However, an external electrical potential can be used to control or modify the galvanic reaction, while the reaction is still called a "galvanic reaction" or a "spontaneous reaction." The discharge of the current flow can be regulated. The galvanic reaction can be a source of power, voltage, and current, and these reactions can be used to power other systems and loads as known in the art.

The elements of a method using a galvanic reaction are known and described more hereinbelow. They include, for example, at least one anode, at least one cathode, and connections between the anode and cathode to allow current flow and form a circuit. The connections can provide electronic or ionic current flow. For example, wiring can be used and devices can be used to measure the potential and current flow. Ionic flow can be enabled with use of salt bridges or ion exchange membranes. The salt bridge or ion exchange membrane can have a geometry and length which help to determine the rate of the redox reaction. The transport of the appropriately charged moiety, an anion, can be mediated through the salt bridge or the ion exchange membrane to complete the circuit. For instance, in one embodiment, a cation such as a zinc cation dissolved in the solution in the metal cell cannot migrate or transfer through the ion exchange membrane. However the anion (e.g., $Cl^-$) is able to diffuse through the membrane and into the carbide cell. In one embodiment, the salt bridge is replaced with, or used with, or comprises an ion exchange membrane. In any event, the salt bridge or ion exchange membrane can be adapted to avoid being a rate limiting step ("bottle neck") for the process and pass as much charge as possible.

The elements of a method using an electrolytic reaction are also known.

In one embodiment, the electrochemical cell (e.g., galvanic cell) apparatus further comprises at least one cathode which can be a metal cathode. Mixtures of metals can be used.

The cathode can be used in conjunction with a solution comprising a dissolved salt including a metal cation and an anion. In principle, any ion/metal combination where the ion can be reduced to the metal can be used for a cathode employing this method. More specifically, in principle, any elemental metal immersed in a solution containing ions of that metal, where the ions can be reduced to the elemental state in order to facilitate the oxidation of the carbide ions to elemental carbon, can be used. Examples include zinc metal in a solution of zinc ions, tin metal in a solution of stannous ions, silver metal in a solution of silver ions, and iron in a solution of ferrous ions. In selecting the cathode, practical considerations can be taken into account. For example, issues like corrosion of the metal cathode can be considered. Other factors to consider include, for example, the characteristics of the solvent and the overall solution and how they would interact with the different components of the reaction system. Solubility of the various metallic salts in the different solvents or solvent combinations would also be an issue.

In one embodiment, the electrochemical cell (e.g., galvanic cell) apparatus further comprises at least one metal cathode, wherein the cathode is a zinc, tin, iron (include steel), copper, or silver metal cathode. In another embodiment, the electrochemical cell (e.g., galvanic cell) apparatus further comprises at least one metal cathode, wherein the cathode is a zinc or tin metal cathode.

In one embodiment, the galvanic cell apparatus anode is contacted with at least one first solution comprising at least one first solvent and at least one first salt and a galvanic cell apparatus cathode is also contacted with at least one second solution comprising at least one second solvent and at least one second salt. The solvent and salt combination for both the anode and cathode sides of the cell should provide sufficient ionic conductivity for the process to be enabled. The viscosity of the solvent can be also considered in solvent selection for first and second solvent. For first and second solvent, the solvent can be, for example, a polar organic solvent such as an alcohol such as methanol or ethanol, or an ether such as tetrahydrofuran, or an aprotic solvent such as DMSO or NMP. Examples of solvents include N-methyl pyrrolidone, dimethyl formamide, acetone, tetrahydrofuran, pyridine, acetonitrile, methanol, ethanol, tetramethylurea, and/or dichlorobenzene. Mixtures of solvents can be used. In general, water is avoided in the solvent, and solvents can be dried. In some cases, slow reaction between the solvent and the carbide chemical compound may occur. For example, methanol can react with calcium carbide to form calcium methoxide. Typically, the reaction apparatus should be relatively inert to the solvent so that side reactions are minimized or avoided.

The salts for the cathode and anode sides of the cell can be selected to provide the cation or the anion which enable the reaction to work well. For example, the cathode metal being reduced can be used in conjunction with a salt which has the oxidized metal as cation. The anion of the salt can be a halide such as fluoride, chloride, bromide, or iodide. However, the fluoride can cause a high heat of reaction which can generate problems so fluoride salts can be avoided. Chloride salts generally are preferred. Examples of salts include zinc chloride, calcium chloride, stannous chloride, ferrous chloride, cupric chloride, silver chloride, aluminum chloride, lithium chloride, calcium fluoride, stannous fluoride, aluminum fluoride, and lithium fluoride.

An important factor also is that the cation of the carbide must form a soluble salt with the anion of the cathode cell. This may not be possible in some cases such as some sulfate salts including calcium sulfate.

In one embodiment, the galvanic cell apparatus further comprises at least one salt bridge and/or at least one ion exchange membrane. Ion exchange membranes are known in the art and typically are made of a polymeric material attached to charged ion groups. Anion exchange membranes contain fixed cationic groups with mobile anions; they allow the passage of anions and block cations. Cation exchange membranes contain fixed anionic groups with mobile cations; they allow the passage of cations and block anions. See, for example, Y. Tanaka, *Ion Exchange Membranes: Fundamentals and Applications*, $2^{nd}$ Ed., 2015. Herein, the use of ion exchange membranes can help prevent formation of unwanted side products and migration of undesired materials from one cell to the other cell.

In one embodiment, steps are taken so that the reaction is carried out under anhydrous conditions. Moisture can be excluded to the extent needed. Also, inert gases can be used such as argon or nitrogen.

The reaction time can be adapted to the need. Reaction time can be, for example, one minute to 30 days, or one day to 20 days.

In one embodiment, the production of carbon is carried out without use of an external voltage source. The current flow from the spontaneous reaction is not controlled by external voltage in this embodiment.

In another embodiment, however, the galvanic cell apparatus comprises an external voltage source which is used to regulate the oxidation reaction, and in another embodiment, the production of carbon is carried out with use of an external voltage source to regulate the oxidation reaction. This can also be called a "forced current" embodiment. The application of an external voltage source allows one to control the voltage over time using a controlled voltage over time curve, including a step curve, for example. Constant voltage and/or constant current regimes can be used. Over time, voltage can be increased or decreased. Reaction rate can be controlled and increased using the external voltage. For example, reaction rate (current flow in amperage) might increase at least ten times, or at least twenty times, or at least fifty times, or at least 100 time, or at least 250 times, for example, with the application of external voltage compared to cases with no external voltage applied. The level of external voltage can be determined for a particular system. One wants to avoid side reactions. One often will want to increase reaction rate. Voltage can be, for example, 0 V to 40 V, or 0 V to 30 V, or 0 V to 20 V, or 10 V to 20 V. The external voltage source can be applied with use of a potentiostat as known in the art.

In one embodiment, the electrochemical cell apparatus is an electrolytic cell apparatus. Here, the reaction is not spontaneous, and an external voltage needs to be and is applied to drive the reaction. An example is making lithium or sodium.

Organic Solvent Reaction to Produce Carbon from Carbide

The solution reaction embodiment is described more. Another aspect is provided for the production of elemental carbon material from nanostructured carbide chemical compound at normal temperature and pressure but without an electrochemical apparatus. Here, a method is provided comprising: producing elemental carbon material from the oxidation of carbide in at least one nanostructured carbide chemical compound (e.g., calcium carbide) which is in contact with a solution comprising at least one organic solvent (e.g., methanol) and at least one reactant, such as dissolved salt (e.g., calcium chloride), comprising at least one metal cation which is reduced. If a cation is used, the cation is selected so that a spontaneous reaction can occur wherein the carbide is oxidized and the metal cation is reduced. However, in this embodiment, the molten salt approach and the electrochemical approach described herein are not used. Rather, in this embodiment, the reaction can be carried out in a single reaction container and need not be split into two cells as is done with the electrochemical reaction.

In this embodiment, the temperature and pressure can be as described above. Normal temperature and pressure can be used. However, heat or cooling can be applied if desired.

The carbide chemical compound can be as described herein using, for example, aluminum carbide or calcium carbide. The selection of salts, cations, and anions also can be made as described herein.

Examples of the organic solvent include solvents listed herein for the electrochemical reaction such as an alcohol such as methanol or ethanol as described herein. Polar solvents are needed which can dissolve a salt. A protic solvents can be used. Ideally, the solvent would not react with nanostructured carbide chemical compound. Alternatively, it reacts with carbide but only very slowly.

The elemental carbon material produced is described herein also.

The reaction time can be adapted to the need.

Anhydrous reaction conditions can be used. For example, a dry box can be used to avoid side reactions with water or oxygen.

Apparatus

Devices and apparatuses for the reaction of nanostructured carbide chemical compound can be adapted for the method, e.g., whether an electrochemical, melt, or solution method.

Another aspect provides for an apparatus which can be used to carry out the methods described herein, including an apparatus comprising at least one electrochemical cell comprising: at least one anode comprising at least one nanostructured carbide chemical compound, and at least one cathode. This apparatus can be used to carry out the methods described and/or claimed herein. Carbide electrode structures which can be used in the apparatus are described further hereinbelow. Elemental carbon material reaction products are described further hereinbelow. Other embodiments include methods of making these apparatuses. A plurality of apparatuses can be used in a larger system if desired.

The electrochemical apparatus can be a galvanic cell apparatus or an electrolytic cell apparatus. The galvanic cell is preferred.

In one embodiment, the nanostructured carbide chemical compound is a salt-like carbide or an intermediate transition metal carbide. In one embodiment, the nanostructured carbide chemical compound is a salt-like carbide. In one embodiment, the nanostructured carbide chemical compound is a methanide, an acetylide, or a sesquicarbide. In one embodiment, the nanostructured carbide chemical compound is calcium carbide, aluminum carbide, sodium carbide, magnesium carbide, lithium carbide, beryllium carbide, iron carbide, copper carbide, and chromium carbide. In one embodiment, the nanostructured carbide chemical compound is calcium carbide or aluminum carbide. In one embodiment, the nanostructured carbide chemical compound has sufficient electronic conductivity to function as an anode. In one embodiment, the nanostructured carbide chemical compound has an electronic conductivity of at least $10^{-8}$ S/cm, or at least $10^{-7}$ S/cm, or at least $10^{-6}$ S/cm, or at least $10^{-5}$ S/cm, or at least $10^{-4}$ S/cm, or at least $10^{-3}$ S/cm, or at least $10^{-2}$ S/cm, or at least $10^{-1}$ S/cm, or at least $10^{0}$ S/cm. The electronic conductivity of calcium carbide provides a useful benchmark for sufficient conductivity. No particular upper limit is present except for the limits provided by nature for a particular nanostructured carbide.

In one embodiment, the nanostructured carbide chemical compound is held in a container.

In one embodiment, the galvanic cell apparatus anode is contacted with a solution comprising at least one solvent and at least one salt.

In one embodiment, the electrochemical cell apparatus anode is contacted with a solution comprising at least one organic solvent and at least one dissolved salt, as described above. In one embodiment, the electrochemical cell apparatus cathode is contacted with a solution comprising at least one organic solvent and at least one dissolved salt as described above. In one embodiment, the electrochemical cell apparatus cathode is a metal cathode as described above. In one embodiment, the electrochemical cell apparatus cathode is a metal cathode, wherein the metal is zinc, tin, iron, copper, or silver. In one embodiment, the electrochemical cell apparatus cathode is a metal cathode, wherein the metal is zinc or tin.

In one embodiment, the electrochemical cell apparatus comprises an external voltage source to regulate an oxidation reaction of carbide in the carbide chemical compound. For example, a potentiostat can be used to provide such an external voltage which can be varied.

In one embodiment, the apparatus is adapted for carrying out the methods described and/or claimed herein.

The Carbide Electrode Structure and Methods of Use

The nanostructured carbide chemical compound can be used in and adapted for use in an electrode structure. Hence, yet another aspect provides for an electrode structure comprising at least one nanostructured carbide chemical compound. Optionally the carbide chemical compound is a salt-like carbide. Optionally, at least one electronically conductive element different from the carbide chemical compound forms part of the electrode structure. This electrode structure can be used to carry out the methods and to prepare the apparatuses described and/or claimed herein. Embodiments described herein also include methods of making and methods of using the nanostructured carbide electrode structure. Multiple electrode structures can be used as part of a larger electrode system. The shape of the electrode can be varied for the need. The conductivity of the electrode can be adapted to the need. The solid properties and macro-, micro-, and nano-scale morphology, such as the size and shapes of openings, porosity, and pore size, can be adapted to the need.

The solid electrode structure and the nanostructured carbide chemical compound can be contacted with at least one liquid for a redox reaction. The electrode structure provides a reaction of the carbide chemical compound which is not just a surface reaction but can extend to the internal structure of the carbide chemical compound. While the present inventions are not limited by theory, it is believed that the carbon carbide layer of the carbon compound at the surface is reacted to form elemental carbon material as the cation (e.g, calcium) is transported away from the carbon into solution. Multiple layers of carbon can be built up. The surface of the carbide can have some porosity.

The carbide electrode can be an electrode (an anode) where the chemical reaction can occur within the electrode instead of just at the surface. The electrode material itself (e.g., calcium carbide) is being consumed in the reaction where the calcium ion dissolves into the solution and the elemental carbon material is remaining.

In one embodiment, the carbide chemical compound of the electrode is a salt-like carbide or an intermediate transition metal carbide. In one embodiment, the carbide chemical compound is a salt-like carbide. In one embodiment, the carbide chemical compound is a methanide, an acetylide, or a sesquicarbide.

In one embodiment, the carbide chemical compound is calcium carbide, aluminum carbide, sodium carbide, magnesium carbide, lithium carbide, beryllium carbide, iron carbide, copper carbide, chromium carbide, and chromium carbide. In one embodiment, the carbide chemical compound is calcium carbide, aluminum carbide, sodium carbide, magnesium carbide, lithium carbide, or beryllium carbide. In one embodiment, the carbide chemical compound is calcium carbide or aluminum carbide, preferably calcium carbide. In one embodiment, the carbide chemical compound has sufficient electronic conductivity to function as an anode. In one embodiment, the carbide chemical compound has an electronic conductivity of at least $10^{-8}$ S/cm or other ranges described herein such as at least $10^{-7}$ S/cm, or at least $10^{-6}$ S/cm, or at least $10^{-5}$ S/cm, or at least $10^{-4}$ S/cm, or at least $10^{-3}$ S/cm, or at least $10^{-2}$ S/cm, or at least $10^{-1}$ S/cm, or at least $10^{0}$ S/cm. No particular upper limit is present except for the limits provided by nature for a particular carbide. In one embodiment, the carbide chemical compound is an ionically bonded solid.

In one embodiment, the carbide chemical compound is in the form of individual pieces or particles which have to be contained within an electrode structure. In one embodiment, the carbide chemical compound is produced in a form to provide maximum or large amounts of surface area. This can facilitate reaction of the carbide at its surface. The particle size and surface area can be adapted to the multiple needs.

In some embodiments, the carbide chemical compound can be used with one or more additional, different materials such as an additive. Materials and additives which are useful for making electrodes can be used. For example, a binder can be used.

In one embodiment, the nanostructured carbide chemical compound is held in a container. In one embodiment, the container has openings which allow fluid, such as an electrolyte, to enter the container and contact the carbide chemical compound. Of course, the container must be able to contain the nanostructured carbide chemical compound.

In one embodiment, the nanostructured carbide chemical compound is divided into portions. In one embodiment, the carbide chemical compound is divided into approximately equal portions.

In one embodiment, the nanostructured carbide chemical compound used in the electrode is at least about 80 wt. % pure, or at least 90 wt. % pure, or at least 95 wt. % pure, or at least 97 wt. % pure.

The electronically conductive element should have good electronic conductivity such as, for example, at least $10^{-3}$ S/cm, or at least $10^{-2}$ S/cm, or at least $10^{-1}$ S/cm, or at least $10^0$ S/cm.

In one embodiment, the electronically conductive element is a binder for the carbide chemical compound.

In one embodiment, the electronically conductive element is adapted to be non-reactive with the reaction media. For example, it should be inert to the contacting solution, or at least inert enough to effectively conduct the reaction for the need.

In one embodiment, the electronically conductive element is a container and the carbide chemical compound is held in the container.

In one embodiment, the electronically conductive element is a metallic container and the carbide chemical compound is held in the metallic container. In one embodiment, the electronically conductive element is a non-metallic container such as graphite and the carbide chemical compound is held in the non-metallic container such as graphite. For example, graphite baskets can be used.

In one embodiment, the electronically conductive element comprises at least one conductive rod.

In one embodiment, the electrode structure is adapted to be removably attached to an apparatus.

In one embodiment, the electronically conductive element of the electrode structure comprises at least one current collector.

In one embodiment, the electrode structure is adapted for use as an anode in, for example, an electrochemical cell apparatus.

For example, provided is a method comprising operating at least one anode in an electrochemical cell, wherein the anode comprises at least carbide chemical compound which includes a method comprising operating at least one anode in a galvanic cell, wherein the anode comprises at least carbide chemical compound. The electrochemical cell apparatus can be a galvanic cell apparatus or an electrolytic cell apparatus. The apparatus can be used for production of elemental carbon material. However, other embodiments are possible for uses other than the production of elemental carbon material. Other uses of the apparatus with the carbide electrode include oxidation reactions such as, for example, conversion of aldehyde to carboxylic acid, and oxidation of a metal such as ferrous ion to ferric ion. Such reactions could be useful in, for example, environmental processes such as, for example, acid mine drainage or sewage treatment.

In most cases, the one or more nanostructured carbide chemical compounds is the only electrochemically reactive moiety participating in the oxidation part of the redox reaction. In one embodiment, the anode electrochemically active material consists essentially of at least one nanostructured carbide chemical compound. In another embodiment, the anode electrochemically active materials consist of at least one nanostructured carbide chemical compound. Here, a conductor such as a metal which is not oxidized or reduced in the anode is not considered an electrochemically active material.

Carbon Product

Still further, another aspect provides for an elemental carbon material composition prepared by the methods, or with use of the apparatuses or carbide electrode structures, described and/or claimed herein. The elemental carbon material can be described and/or claimed by the characteristics of the elemental carbon material and/or by how it was made. Elemental carbon materials are materials known in the art to focus on the carbon content and do not include organic compounds such as methane, methanol, or acetic acid. Examples such as graphite and diamond are well-known as elemental carbon materials. These compositions can range from the compositions as initially prepared from the carbide chemical compound to the compositions as they exist after one or more treatment, purification, and/or separation steps (post-processing steps including exfoliation and doping steps, for example). The compositions can be mixtures of different forms of the elemental carbon material. The composition can comprise crystalline portions and/or amorphous portions. The carbon can be in the form of one or more graphene layers, and it can be in an exfoliated form. Preferred embodiments for graphene include atomically thin single sheet graphene or few layer graphene. Graphene can have 1-10 layers for example. Thicker forms of graphene also can be of interest. Also, the elemental graphene material, including graphene forms, can be disposed on substrate films.

Because the carbide chemical compound is nanostructured, the elemental carbon products which are nanostructured are of particular interest. In some cases, the carbon product may have a shape that is similar to the shape of the carbide chemical compound undergoing reaction.

Characterization methods for elemental carbon materials are well known and include analysis of microstructure, morphology, and physical properties. For example, carbon black materials are well known and characterized as described in, for example, (1) *Carbon Black: Production, Properties, and Uses* (Sanders et al., Eds.), and (2) *Carbon Black: Science and Technology*, $2^{nd}$ Ed., (Donnet et al., Eds.) 1993. Morphological properties of elemental carbon materials include, for example, particle size, surface area, porosity, aggregate size, and aggregate shape. Physical properties include density, electronic, thermal, bulk, and impurities. Microstructure analysis includes XRD, Dark Field Electron Microscopy, Oxidation Studies, Diffracted Beam Electron Microscopy, Phase Contrast TEM imaging, and High Resolution SEM, STEM, STM, SFM, and AFM imaging.

Other characterization methods for carbon are known and described further herein. See, for example, review article by Chu et al., *Materials Chemistry and Physics*, 96 (2006), 253-277, which describes characterization of amorphous and nanocrystalline carbon films. Methods described include optical (Raman, both visible and UV, and IR), electron spectroscopy and microscopy (e.g, XPS, AES, TEM of various kinds, and EELS), surface morphology (AFM, SEM), NMR, and X-ray reflectivity. Methods described include how to measure sp2:sp3 ratios.

The elemental carbon material can provide many novel, interesting, and useful structures when viewed under an SEM, including at a 200 micron scale bar view or less. Features shown in the SEM figures can be used to describe and claim the elemental carbon materials. Spots on the elemental carbon material also can be selected for Raman spectroscopy, and Raman data can also be used to describe and claim the elemental carbon materials. Other data such as EDAX and XRD can also be used to describe and claim the elemental carbon materials.

Generally, high purity elemental carbon materials are desired. In one embodiment, the elemental carbon material is more than 70%, or more than 80%, or more than 90%, or more than 95%, or more than 98%, or more than 99% (atomic percentage) carbon. This percentage can be measured by, for example, elemental analysis methods including SEM-EDAX. Of course, in some embodiments, less high purity may be acceptable. Also, in some embodiments, non-carbon elements can be deliberately incorporated such as in a doping process.

In one embodiment, the elemental carbon material is more than 50%, or more than 60%, or more than 70%, or more than 80%, or more than 90% sp2 carbon. A combination of analytical techniques can be used to determine an accurate estimate. For example, there is also the possibility of analysis using bromine. Sp2 carbon absorbs a certain amount of bromine relative to amorphous carbon or even possibly sp1 carbon if we can produce it. Sp3 carbon does not absorb bromine at all. Therefore, we may be able to quantitatively determine these percentages using a type of bromine absorption test.

In one embodiment, the elemental carbon material is more than 50%, or more than 60%, or more than 70%, or more than 80%, or more than 90% sp3 carbon.

In one embodiment, the elemental carbon material comprises two-dimensional plate-like structures. These structures can be stacked on top of one another. In another embodiment, the elemental carbon material comprises three-dimensional structures.

In some embodiments, the elemental carbon material has amorphous carbon content. In other cases, crystalline carbon can be present.

In some cases, particles can be isolated, and average particle size ($d_{50}$) can be, for example, 500 nm to 500 microns, or one micron to 100 microns, or two microns to 50 microns, or 10 microns to 30 microns. If desired, nanoscopic particles can be isolated with average particle size of less than 500 nm such as, for example, 10 nm to 500 nm, or 20 nm to 100 nm. Commercial particle size analyzers can be used to measure particle size.

The elemental carbon material, at various stages of purification and isolation, can be tested by methods known in the art including, for example, optical microscopy, electron microscopy including scanning electron microscopy (SEM) and transmission electron microscopy (TEM), energy dispersive x-ray analysis (EDX), Raman and FTIR spectroscopy, x-ray diffraction, X-ray photoelectron spectroscopy (XPS), Auger electron spectroscopy (AES), low energy and high energy electron energy loss spectroscopy (EELS), neutron scattering, ellipsometry, electrical resistance, and atomic force microscopy (AFM). Particle analysis can also be carried out including measurement of particle size and surface area. Electrochemical testing can also be carried out. Tribology, wear, friction, indentation, modulus, hardness testing can also be carried out.

For Raman spectroscopy, a G band (around 1590 cm$^{-1}$) can be present in crystalline graphite and a D band (around 1345 cm$^{-1}$) can be present associated with disordered graphite. The ratio of the two bands can be used to characterize the degree of graphitization and the graphite crystallite size.

The elemental carbon material produced can be analyzed by surface analytical methods such as AFM or XPS. For example, XPS analysis can show higher levels of oxygen at the surface than in the bulk material. This can mean that the surface of the material had formed graphene oxide. Graphene oxide, in principle, could be formed as part of the reaction or due to the separation and purification operations. Other surface elements can include O, H, N, S, and halogens.

In another embodiment, the elemental carbon material comprises sp1 carbon material.

In some embodiments, the methods described herein can be used to produce an allotrope of carbon that is $C_{70}$. In some embodiments, the methods can be used to produce an allotrope of carbon that is $C_{60}$. Other kinds of fullerenes can be made. In some embodiments, the methods described herein can be used to produce an allotrope of carbon that is Herringbone Multi Wall Carbon Nano Tubes ("MWCNT"). Single-walled carbon nanotubes also can be made. In some embodiments, the methods described herein can be used to produce an allotrope of carbon that is Cylindrical MWCNT. In some embodiments, the methods described herein can be used to produce an allotrope of carbon that comprises carbon fibers.

The methods described herein can produce carbon with $sp^1$, $sp^2$, and/or $sp^3$ hybridization, as well as mixtures thereof. The $sp^1$ hybridized carbon can be in the form of carbyne. The $sp^2$ hybridized carbon can be in the form of carbene, graphite, and/or graphene. The $sp^3$ hybridized carbon can be in the form of diamond.

Particular carbon materials may thus be produced through the application of external voltage to an electrolysis cell wherein at least one of the electrodes is a carbide.

In some embodiments, the methods described herein can be used to produce an allotrope of carbon that is $sp^2$ hybridized, and contains no $sp^3$ hybridization. In some embodiments, the methods described herein produce an allotrope of carbon that is $sp^3$ hybridized, and contains no $sp^2$ hybridization. In some embodiments, the methods described herein produce an allotrope of carbon that is $sp^1$ hybridized and contains neither $sp^2$ or $sp^3$ hybridization.

In some cases, the elemental carbon material can have more sp2 than sp3 hybridized carbons, and in other cases, the elemental carbon material can have more sp3 than sp2 hybridized carbons. The ratio of sp2:sp3 can be, for example, 1:10 to 10:1, or 1:8 to 8:1, or 1:6 to 6:1, or 1:4 to 4:1, or 1:2 to 2:1.

The methods described herein can be used to produce a product that is more than 50%, more than 55%, more than 60%, more than 65%, more than 70%, more than 75%, more than 80%, more than 85%, more than 90%, more than 95% sp$^1$ hybridized.

In an embodiment, the methods described herein produce a product that is more than 50%, more than 55%, more than 60%, more than 65%, more than 70%, more than 75%, more than 80%, more than 85%, more than 90%, more than 95% sp$^2$ hybridized.

In some embodiments, the methods described herein produce a product that is more than 50%, more than 55%, more than 60%, more than 65%, more than 70%, more than 75%, more than 80%, more than 85%, more than 90%, more than 95% sp$^3$ hybridized.

In some embodiments, the methods described herein produce a product that is more than 50%, more than 55%, more than 60%, more than 65%, more than 70%, more than 75%, more than 80%, more than 85%, more than 90%, more than 95% sp$^2$ hybridized in the form of graphite.

In some embodiments, the methods described herein produce a product that is more than 50%, more than 55%, more than 60%, more than 65%, more than 70%, more than 75%, more than 80%, more than 85%, more than 90%, more than 95% sp$^3$ hybridized in the form of diamond.

Large area pieces of carbon, having high levels of elemental carbon purity, are of particular interest. They can be, for example, a source for large area graphene. The piece may have a lateral dimension of, for example, at least one mm, or at least two mm, or at least one cm, or at least two cm. The lateral dimension can be a length or a width of a piece or particle. In some cases, both the length and the width can be at least 1 mm, or at least 2 mm, or at least 1 cm, or at least two cm. The volume of the piece can be, for example, at least one cubic mm, or at least one cubic cm (cc), or at least 8 cubic cm (cc). Also important are forms of carbon having flat surfaces whether of lower or higher flat surface area.

Carbon structures are shown in the SEM and optical photographs provided herein which can be of commercial use. In many cases, it is desired to have crystalline forms of the elemental carbon material rather than amorphous forms.

In some embodiments, the elemental carbon material comprises at least some two-dimensional plate-like structures. In some embodiments, the elemental carbon material comprises at least some two-dimensional plate-like structures stacked on top of one another. Graphene structures may be evident. Thicker graphene structures can be converted to thinner graphene structures. In some embodiments, the elemental carbon material comprises at least some three-dimensional structures.

In some embodiments, the elemental carbon material shows porous structures or voids.

In some embodiments, bent structures can be seen. The bent structure can be characterized by an acute angle, and the angle can be controlled by the synthesis method. In other embodiments, rods can be formed. In some embodiments, curved elemental particles can be observed. In some embodiments, perpendicular features can be observed.

Further structures can be observed with higher resolution analytical methods.

Post Reaction Processing of Elemental Carbon Material

After forming in the apparatus, the elemental carbon material can be further treated beginning with, for example, purification and/or mechanically changing the form into, for example, other powder or particle forms. Treatments can be mechanical or chemical. The piece of product can be subjected to various mechanical steps such as grinding, exfoliation, or polishing steps. Additional treatment steps can include, for example, doping and intercalation steps. Some of the elemental carbon material may be attached to the electrode and will need to be removed from the electrode. Other elemental carbon material may leave the electrode during the reaction and may, for example, sink to the bottom of the reaction cell for collection. Process steps can be carried out to separate carbon from non-carbon materials, and separate one form of carbon from another form of carbon.

PCT Application PCT/US2014/028755, filed Mar. 14, 2014 and published as WO 2014/144374, also describes a method of making carbon from carbide and metal salts in a thermal process, and also describes various post reaction processing steps which can be used.

In another embodiment, the elemental carbon material is removed and treated with acid and washed or flushed with water. Strong acids such as HCl can be used.

In one embodiment, the elemental carbon material can be converted to a different particle form, and the particles separated based on particle size.

Graphene exfoliation steps are known in the art and described in, for example, Bonaccorso et al., *Materials Today*, December 2012, 15, 12, 564. In particular, large area graphene sheet production is of interest. The large pieces of elemental carbon material produced by methods described herein can enable production of large area graphene. A solvent such as NMP can be used for exfoliation. Sonication can also be used for exfoliation. Larger pieces of carbon in many cases require higher power to exfoliate. The exfoliation process can be controlled so as to control the thickness of the exfoliated product, such as graphene. Electrochemical exfoliation can be carried out.

Also described herein are derivative compositions associated with the elemental carbon material compositions described herein. For example, the elemental carbon material compositions described herein can be mixed with or doped with other elements, compounds, ingredients, additives, and/or materials.

Applications

Selected representative examples of applications are described below. Devices, apparatuses, systems, kits, methods of making, and methods of using that are associated with these applications are also described herein including devices, apparatuses, systems, and kits which comprise the elemental carbon materials and their derivatives described herein (e.g., battery, fuel cell, or filtration devices). The elemental carbon reaction products, whether in bulk form, microscale form, or nanoscale form, can be used in a wide-variety of applications including, for example, applications generally known for carbon materials including applications known, more specifically, for graphite materials, applications known for diamond materials, applications known for amorphous carbon, and applications known for nanoscale forms of carbon, for example. In some cases, the elemental carbon material can be mixed with one or more other ingredients for application use.

Carbon black, for example, is used as filler, pigment, toners, and reinforcement agent.

Many applications relate to the electrically conductive properties of carbon and the electronics and semiconductor industries. For example, carbon inks are known including conductive inks. Carbon-based fillers or conductive agents are known.

Activated carbon has many applications. Sorbent applications can be carried out. In general, applications of the carbon which require high surface area carbon can be found. Sorbents can be, for example, used as soil detoxicants, gas drying agents, chemical adsorbents, and catalysts.

Graphite is a material found in nature and also is synthetically produced. Examples of natural graphite are flake, crystalline, and amorphous graphite. Graphite flakes can have flat, plate-like particles with hexagonal or angular edges. The percent carbon can impact the application. Graphite can be used as electrodes, pastes, brushes, crucibles, lubricants, foundry facings, moderator bricks in atomic reactors, paints, pencils, brake linings, foundry operations, refractory applications, steel making, lithium-ion batteries, fuel cells, and the like.

In particular, batteries including lithium and lithium-ion batteries can be an application, as well as air batteries such as zinc air batteries. Lithium-ion batteries are described in, for example, Yoshio et al. (Eds.), *Lithium-Ion Batteries: Science and Technologies*, including chapter 3 (pages 49-73) and chapter 18 (pages 329-341) which focus on carbon anode materials, as well as chapter 5 (pages 117-154) which focuses on carbon-conductive additives and chapter 22 (pages 427-433) which focuses on novel hard-carbon materials.

Graphene can be used in advanced semiconductor devices. Large area graphene is important. Other applications include filters (including water filtration and desalinization of sea water), batteries, touch screens, capacitors, fuel cells, sensors, high frequency circuits, flexible electronics, computing, data storage, solar, and photovoltaics.

Diamonds can be low quality or high quality and are applied in applications which use hardness including abrasion resistant materials, as well as drilling, polishing, and cutting materials. Diamonds also can be used for sensors, electronics, medical imaging, semiconductors, super computers, and sonar. Diamonds also can be gems.

Carbon related materials such as $CaC_6$ have been shown to be superconducting. Other applications for sp1 materials relate to use of superconductor materials and even high temperature or room temperature superconductor materials.

Carbon nanotube products can be in the form of "forests" of microscopic tubular structures. They can be used in, for example, baseball bats, aerospace wiring, combat body armor, computer logic components, and microsensors in biomedical applications. Carbon nanotubes also can be used in lithium ion batteries and various sporting equipment.

Another type of application is the use of the nanostructured carbide chemical compound for other uses besides making carbon such as a use as catalysts.

Example

In one example, a nanostructured calcium carbide material is prepared according to CN 1498976 using the Union Process. The average particle size is about 100 nm, although other average particle sizes such as 50-250 nm can be made. The nanostructured calcium carbide is then subject to reaction with a reactant to form carbon, wherein the reactant is provided in a melt phase or in solution. Alternatively, the nanostructured calcium carbide can be integrated into an electrode structure and placed in an electrochemical cell to provide the reaction to form carbon.

The various embodiments and claims described herein can be combined with other embodiments and claims described herein.

What is claimed is:

1. A method comprising: providing at least one carbide chemical compound and reducing at least one reactant with use of the carbide chemical compound to form elemental carbon, wherein the carbide chemical compound is nanostructured in one dimension and in the form of at least one nanofilm; (2) the carbide chemical compound is nanostructured in two dimensions and in the form of at least one nanowire; or (3) the carbide chemical compound is nanostructured in three dimensions and in the form of at least one nanoparticle.

2. The method of claim 1, wherein the elemental carbon is nanostructured carbon in the form of nanoparticulate carbon.

3. The method of claim 1, wherein the carbide chemical compound is nanostructured in one dimension and is in the form of the at least one nanofilm.

4. The method of claim 1, wherein the elemental carbon is processed to separate one form of carbon from another form of carbon.

5. The method of claim 1, wherein the carbide chemical compound is nanostructured in two dimensions and is in the form of the at least one nanowire.

6. The method of claim 1, wherein the elemental carbon is processed to separate carbon from non-carbon material.

7. The method of claim 1, wherein the carbide chemical compound is nanostructured in three dimensions and is in the form of the at least one nanoparticle.

8. The method of claim 1, wherein the nanostructured carbide chemical compound comprises a rounded surface.

9. The method of claim 1, wherein the nanostructured carbide chemical compound comprises a flat surface.

10. The method of claim 1, wherein the nanostructured carbide chemical compound is in the form of the at least one nanoparticle, wherein the at least one nanoparticle is part of a collection of nanoparticles of the carbide chemical compound having an average diameter of 1 nm to 1,000 nm.

11. The method of claim 1, wherein the nanostructured carbide chemical compound is in the form of the at least one nanoparticle, wherein the at least one nanoparticle is part of a collection of nanoparticles of the carbide chemical compound having an average diameter of 100 nm to 1,000 nm.

12. The method of claim 1, wherein the nanostructured carbide chemical compound is in the form of the at least one nanoparticle, wherein the at least one nanoparticle is part of a collection of nanoparticles of the carbide chemical compound having an average diameter of 1 nm to 100 nm.

13. The method of claim 1, wherein the nanostructured carbide chemical compound is in the form of the at least one nanoparticle, wherein the at least one nanoparticle is part of a collection of nanoparticles of the carbide chemical compound having an average diameter of 500 nm to 1,000 nm.

14. The method of claim 1, wherein the nanostructured carbide chemical compound is in the form of the at least one nanoparticle, wherein the at least one nanoparticle is part of a collection of nanoparticles of the carbide chemical compound having an average diameter of 1 nm to 500 nm.

15. The method of claim 1, wherein the nanostructured carbide chemical compound is in the form of the at least one nanoparticle, wherein the at least one nanoparticle is part of a collection of microparticles of the carbide chemical compound and nanoparticles of the carbide chemical compound.

16. The method of claim 1, wherein the nanostructured carbide chemical compound is in the form of the at least one nanoparticle, wherein the at least one nanoparticle is part of a collection of nanoparticles of the carbide chemical compound which are bound together with a binder.

17. The method of claim 1, wherein the nanostructured carbide chemical compound is in the form of the at least one nanoparticle, wherein the at least one nanoparticle is part of a collection of nanoparticles of the carbide chemical compound which are bound together with an electronically conductive binder.

18. The method of claim 1, wherein the nanostructured carbide chemical compound is in the form of the at least one nanoparticle, wherein the at least one nanoparticle is part of a collection of nanoparticles of the carbide chemical compound which are bound together with a polymeric binder.

19. The method of claim 1, wherein the nanostructured carbide chemical compound is in the form of agglomerated nanoparticles.

20. The method of claim 1, wherein the nanostructured carbide chemical compound is in the form of particles which are generally spherical.

21. The method of claim 1, wherein the nanostructured carbide chemical compound is in the form of the at least one nanowire.

22. The method of claim 1, wherein the nanostructured carbide chemical compound is in the form of the at least one nanowire which has an aspect ratio of less than 10.

23. The method of claim 1, wherein the nanostructured carbide chemical compound is in the form of the at least one nanowire which has an aspect ratio of greater than 10.

24. The method of claim 1, wherein the nanostructured carbide chemical compound is in the form of the at least one nanowire which is a nanorod.

25. The method of claim 1, wherein the nanostructured carbide chemical compound is in the form of the at least one nanowire which is a nanotube.

26. The method of claim 1, wherein the nanostructured carbide chemical compound is in the form of the at least one nanowire, wherein the at least one nanowire is part of a collection of nanowires having an average diameter of 1 nm to 1,000 nm.

27. The method of claim 1, wherein the nanostructured carbide chemical compound is in the form of the at least one nanowire, wherein the at least one nanowire is part of a collection of nanowires having an average diameter of 1 nm to 100 nm.

28. The method of claim 1, wherein the nanostructured carbide chemical compound is at least one nanotube.

29. The method of claim 1, wherein the nanostructured carbide chemical compound is at least one nanotube, wherein the at least one nanotube is part of a collection of nanotubes having an average diameter of 1 nm to 1,000 nm.

30. The method of claim 1, wherein the nanostructured carbide chemical compound is at least one nanotube, wherein the at least one nanotube is part of a collection of nanotubes having an average diameter of 1 nm to 100 nm.

31. The method of claim 1, wherein the nanostructured carbide chemical compound is in the form of the at least one nanofilm.

32. The method of claim 1, wherein the nanostructured carbide chemical compound is in the form of the at least one nanofilm which is in the form of a nanoline.

33. The method of claim 1, wherein the nanostructured carbide chemical compound is in the form of the at least one nanofilm, and the nanofilm is in the form of a nanoline, wherein the nanoline has a line width of 1 mm or less.

34. The method of claim 1, wherein the nanostructured carbide chemical compound is in the form of the at least one nanofilm having an average film thickness of 1 nm to 1,000 nm.

35. The method of claim 1, wherein the nanostructured carbide chemical compound is in the form of the at least one nanofilm having an average film thickness of 1 nm to 100 nm.

36. The method of claim 1, wherein the nanostructured carbide chemical compound is in the form of the at least one nanofilm which is disposed on a substrate.

37. The method of claim 1, wherein the nanostructured carbide chemical compound is mixed with at least one other different material.

38. The method of claim 1, wherein the nanostructured carbide chemical compound is held in a matrix material.

39. The method of claim 1, wherein the nanostructured carbide chemical compound is nanoparticulate calcium carbide.

40. The method of claim 1, wherein the nanostructured carbide chemical compound is nanoparticulate calcium carbide having an average particle diameter of 1 nm to 1,000 nm.

41. The method of claim 1, wherein the nanostructured carbide chemical compound has an electronic conductivity of at least $10^{-8}$ S/cm.

42. The method of claim 1, wherein the carbide chemical compound is a salt-like carbide.

43. The method of claim 1, wherein the carbide chemical compound is an acetylide, a methanide, or a sesquicarbide.

44. The method of claim 1, wherein the carbide chemical compound is calcium carbide or aluminum carbide.

45. The method of claim 1, wherein the carbide chemical compound is calcium carbide.

46. The method of claim 1, wherein elemental carbon material is formed which is more than 50% sp2 carbon.

47. The method of claim 1, wherein elemental carbon material is formed which is more than 50% sp3 carbon.

48. The method of claim 1, wherein elemental carbon material is formed which is more than 50% and sp2 and sp3 carbon.

49. The method of claim 1, wherein elemental carbon material is formed which is more than 50% sp1 carbon.

50. The method of claim 1, wherein the reducing is carried out at a temperature of less than about 400° C.

51. The method of claim 1, wherein the reducing is carried out at a temperature of about 15° C. to about 400° C.

52. The method of claim 1, wherein the reducing is carried out at a temperature of less than about 300° C.

53. The method of claim 1, wherein the reducing is carried out at a temperature of about 15° C. to about 50° C.

54. The method of claim 1, wherein the reducing is carried out at a pressure of about 720 torr to about 800 torr.

55. The method of claim 1, wherein the reducing is carried out at a temperature of about 15° C. to about 50° C. and at a pressure of about 720 torr to about 800 torr.

56. The method of claim 1, wherein the reactant comprises at least one cation.

57. The method of claim 1, wherein the reactant comprises at least one cation, wherein the cation is a zinc, tin, iron, copper, or silver cation.

58. The method of claim 1, wherein the reactant comprises at least one cation, wherein the cation is a zinc or tin cation.

59. The method of claim 1, wherein the reducing is carried out in an electrochemical cell with a cathode compartment comprising a metal cation as reactant and an anode compartment comprising the nanostructured carbide chemical compound.

60. The method of claim 59, wherein the anode compartment comprises at least one electronically conductive structural element different from the nanostructured carbide chemical compound and contacting the nanostructured carbide chemical compound.

61. The method of claim 1, wherein the reducing is carried out in a galvanic cell with a cathode compartment comprising a metal cation as reactant and an anode compartment comprising the carbide chemical compound.

62. The method of claim 1, wherein the reducing is carried out in a galvanic cell with a cathode compartment comprising a metal cation as reactant and an anode compartment comprising the carbide chemical compound, and the galvanic cell further comprises at least one external voltage source.

63. The method of claim 1, wherein the reducing is carried out in a galvanic cell with a cathode compartment comprising a metal cation as reactant and an anode compartment comprising the carbide chemical compound, and the galvanic cell does not comprise at least one external voltage source.

64. The method of claim 1, wherein the reducing is carried out without contact between the reactant and the nanostructured carbide chemical compound.

65. The method of claim 1, wherein the reducing is carried out with contact between the reactant and the nanostructured carbide chemical compound.

66. The method of claim 1, wherein the reducing is carried out with contact between a metal cation as reactant and the nanostructured carbide chemical compound, and the metal cation is part of a molten salt.

67. The method of claim 1, wherein the reducing is carried out with contact between a metal cation as reactant and the carbide chemical compound, and the metal cation is dissolved in at least one organic solvent.

68. The method of claim 1, wherein the elemental carbon is nanostructured carbon.

69. A method comprising: producing elemental carbon material from the oxidation of carbide in at least one carbide chemical compound in at least one anode of an electrochemical cell apparatus, wherein the carbide chemical compound is nanostructured in one dimension and in the form of at least one nanofilm; (2) the carbide chemical compound is nanostructured in two dimensions and in the form of at least one nanowire; or (3) the carbide chemical compound is nanostructured in three dimensions and in the form of at least one nanoparticle.

70. The method of claim 69, wherein the nanostructured carbide chemical compound is in nanoparticulate form.

71. The method of claim 69, wherein the nanostructured carbide chemical compound is in the form of the at least one nanowire.

72. The method of claim 69, wherein the nanostructured carbide chemical compound is in the form of the at least on nanofilm.

73. The method of claim 69, wherein the nanostructured carbide chemical compound is characterized by at least one nanodimension of 1 nm to 1,000 nm.

74. The method of claim 69, wherein the nanostructured carbide chemical compound is characterized by at least one nanodimension of 1 nm to 100 nm.

75. The method of claim 69, wherein the producing step is carried out with use of a reactant which is a metal salt.

76. The method of claim 69, wherein the carbide chemical compound is a salt-like carbide.

77. The method of claim 69, wherein the carbide chemical compound is calcium carbide or aluminum carbide.

78. The method of claim 69, wherein the carbide chemical compound is calcium carbide.

79. A method comprising: producing elemental carbon material from the oxidation of carbide in at least one carbide chemical compound which is in contact with a melt comprising at least one salt comprising at least one metal cation which is reduced, wherein the carbide chemical compound is nanostructured in one dimension and in the form of at least one nanofilm; (2) the carbide chemical compound is nanostructured in two dimensions and in the form of at least one nanowire; or (3) the carbide chemical compound is nanostructured in three dimensions and in the form of at least one nanoparticle.

80. The method of claim 79, wherein the nanostructured carbide chemical compound is in nanoparticulate form.

81. The method of claim 79, wherein the nanostructured carbide chemical compound is in the form of the at least one nanowire.

82. The method of claim 79, wherein the nanostructured carbide chemical compound is in the form of the at least one nanofilm.

83. The method of claim 79, wherein the nanostructured carbide chemical compound is characterized by at least one nanodimension of 1 nm to 1,000 nm.

84. The method of claim 79, wherein the nanostructured carbide chemical compound is characterized by at least one nanodimension of 1 nm to 100 nm.

85. The method of claim 79, wherein the producing step is carried out at a temperature of 400° C. or less.

86. The method of claim 79, wherein the carbide chemical compound is a salt-like carbide.

87. The method of claim 79, wherein the carbide chemical compound is calcium carbide or aluminum carbide.

88. The method of claim 79, wherein the carbide chemical compound is calcium carbide.

89. A method comprising: producing elemental carbon material from the oxidation of carbide in at least one carbide chemical compound which is in contact with a solution comprising at least one organic solvent and at least one dissolved salt comprising at least one metal cation which is reduced, wherein the carbide chemical compound is nanostructured in one dimension and in the form of at least one nanofilm; (2) the carbide chemical compound is nanostructured in two dimensions and in the form of at least one nanowire; or (3) the carbide chemical compound is nanostructured in three dimensions and in the form of at least one nanoparticle.

90. The method of claim 89, wherein the nanostructured carbide chemical compound is in nanoparticulate form.

91. The method of claim 89, wherein the nanostructured carbide chemical compound is in the form of at least one nanowire.

92. The method of claim 89, wherein the nanostructured carbide chemical compound is in the form of the at least one nanofilm.

93. The method of claim 89, wherein the nanostructured carbide chemical compound is characterized by at least one nanodimension of 1 nm to 1,000 nm.

94. The method of claim 89, wherein the nanostructured carbide chemical compound is characterized by at least one nanodimension of 1 nm to 100 nm.

95. The method of claim 89, wherein the producing step is carried out at a temperature of 400° C. or less.

96. The method of claim 89, wherein the carbide chemical compound is a salt-like carbide.

97. The method of claim 89, wherein the carbide chemical compound is calcium carbide or aluminum carbide.

98. The method of claim 89, wherein the carbide chemical compound is calcium carbide.

* * * * *